United States Patent
Laczynski et al.

(10) Patent No.: US 10,904,626 B2
(45) Date of Patent: *Jan. 26, 2021

(54) TECHNOLOGIES FOR ON-DEMAND CONTENT PLAYER SELECTION

(71) Applicant: Zype Inc., New York, NY (US)

(72) Inventors: Edward Laczynski, Westfield, NJ (US); Chris Bassolino, Westfield, NJ (US); Brian Dorry, Hillsborough, NJ (US)

(73) Assignee: Zype Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,876

(22) Filed: Feb. 4, 2019

(65) Prior Publication Data

US 2019/0174195 A1   Jun. 6, 2019

Related U.S. Application Data

(63) Continuation of application No. 15/067,588, filed on Mar. 11, 2016, now Pat. No. 10,200,758.

(Continued)

(51) Int. Cl.
| | |
|---|---|
| H04L 29/08 | (2006.01) |
| H04N 21/472 | (2011.01) |
| H04L 29/06 | (2006.01) |
| H04N 21/258 | (2011.01) |
| H04N 21/254 | (2011.01) |
| H04N 21/4627 | (2011.01) |

(Continued)

(52) U.S. Cl.
CPC ....... *H04N 21/47202* (2013.01); *G06Q 30/00* (2013.01); *G11B 27/00* (2013.01); *H04L 65/4084* (2013.01); *H04L 65/80* (2013.01); *H04L 67/18* (2013.01); *H04N 21/2393* (2013.01); *H04N 21/2541* (2013.01); *H04N 21/2543* (2013.01); *H04N 21/25841* (2013.01); *H04N 21/26225* (2013.01); *H04N 21/44204* (2013.01); *H04N 21/4627* (2013.01); *H04N 21/482* (2013.01); *H04N 21/8358* (2013.01)

(58) Field of Classification Search
CPC ......... H04N 21/47202; H04N 21/8358; H04N 21/2393; H04N 21/482; H04L 67/18; H04L 65/80

See application file for complete search history.

(56) References Cited

U.S. PATENT DOCUMENTS

| | | |
|---|---|---|
| 7,610,597 B1 | 10/2009 | Johnson et al. |
| 7,787,818 B2 | 8/2010 | Shapiro et al. |

(Continued)

OTHER PUBLICATIONS

International Search Report and Written Opinion dated May 20, 2016 in related International Application No. PCT/US2016/022001 filed Mar. 11, 2015, 8 pages.

*Primary Examiner* — Adnan M Mirza
(74) *Attorney, Agent, or Firm* — Dentons US LLP

(57) ABSTRACT

A technology for presenting content enables a receipt of a request over a network for a content from a computer, a determination of a characteristic of the computer and a location of the computer based at least in part on the request, a match of the characteristic and the location against a rule, a selection of a player based at least in part on the match, and a facilitation of a stream of the content via the player over the network to the computer based at least in part on the selection.

65 Claims, 22 Drawing Sheets

Related U.S. Application Data

(60) Provisional application No. 62/133,099, filed on Mar. 13, 2015.

(51) Int. Cl.
| | | |
|---|---|---|
| *H04N 21/2543* | (2011.01) | |
| *H04N 21/239* | (2011.01) | |
| *H04N 21/262* | (2011.01) | |
| *H04N 21/8358* | (2011.01) | |
| *H04N 21/442* | (2011.01) | |
| *H04N 21/482* | (2011.01) | |
| *G06Q 30/00* | (2012.01) | |
| *G11B 27/00* | (2006.01) | |

(56) References Cited

U.S. PATENT DOCUMENTS

| | | |
|---|---|---|
| 8,806,531 B1 | 8/2014 | Ho et al. |
| 9,805,207 B1 | 10/2017 | Nijim et al. |
| 2010/0257569 A1 | 10/2010 | O'Hanlon |
| 2011/0265116 A1 | 10/2011 | Stern et al. |
| 2013/0055303 A1 | 2/2013 | Kannan et al. |
| 2013/0231141 A1* | 9/2013 | Weinreich ............ G01S 5/0036 455/456.3 |
| 2013/0252639 A1* | 9/2013 | Narayan ............ H04L 67/306 455/456.3 |
| 2014/0245359 A1 | 8/2014 | De Foy et al. |

\* cited by examiner

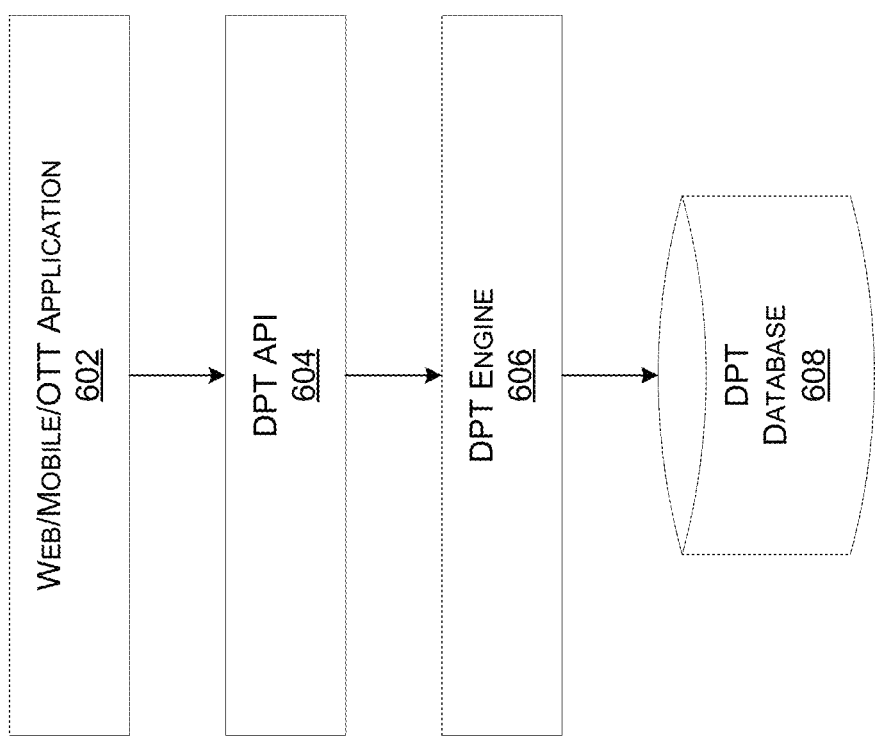

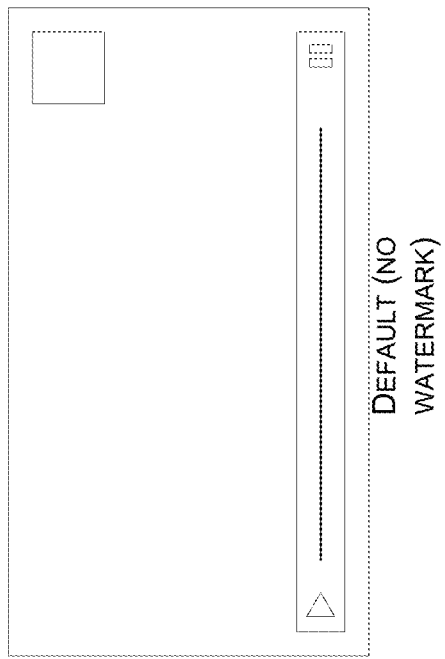
FIG. 10A — WATERMARK TOP RIGHT
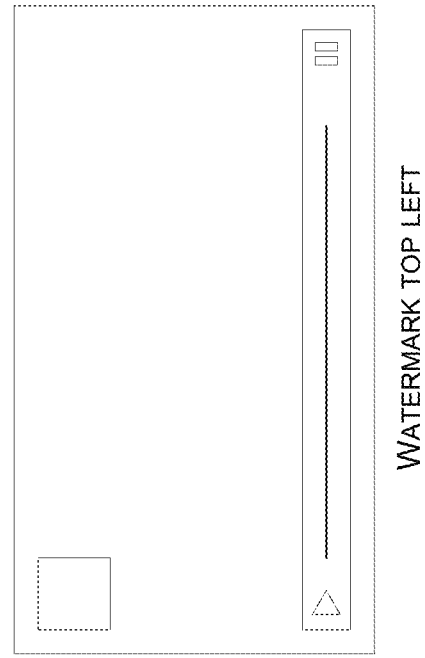
FIG. 10B — DEFAULT (NO WATERMARK)
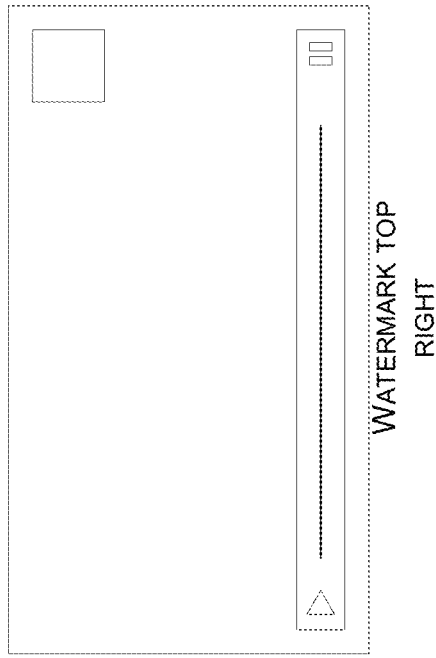
FIG. 10C — WATERMARK TOP LEFT Customer has 4 rules.

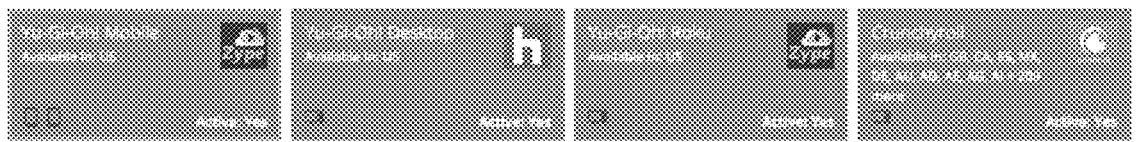

Rule 1: Mobile Device, US Geolocation
Rule 2: Desktop Device, US Geolocation
Rule 3: Roku Device, US Geolocation
Rule 4: Desktop Device, Various International Location Example Rule; Rule #4:

Rule Criteria: Crunchyroll

Availability:
- United Kingdom
- Canada
- Spain
- Mexico
- Germany
- Australia
- Andorra
- United Arab Emirates
- Antigua and Barbuda
- Anguilla
- Albania
- Armenia
- Angola
- Antarctica
- Argentina
- American Samoa
- Austria
- Aruba
- Åland Islands
- Azerbaijan
- Bosnia and Herzegovina

Devices:
Desktop

Player:
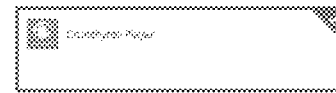
Crunchyroll Player

These rules apply to a library of videos.

These rules *can apply to one or more videos in a library, defined by metadata, categories or tags.*\*\*

FIG. 12A

Creating a New Rule
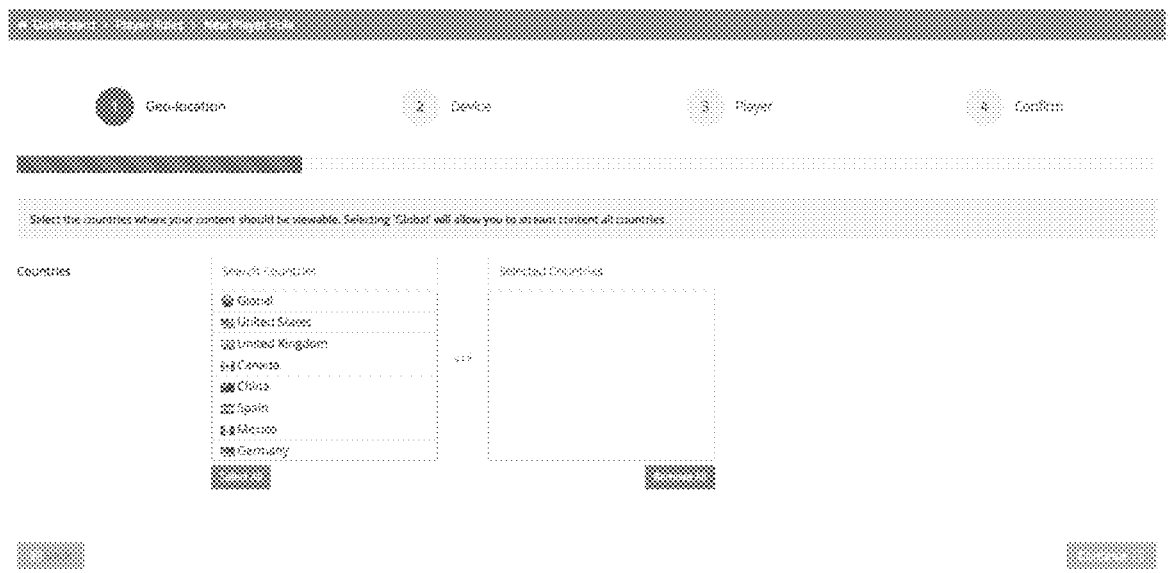
Pick Geo Location    FIG. 12B
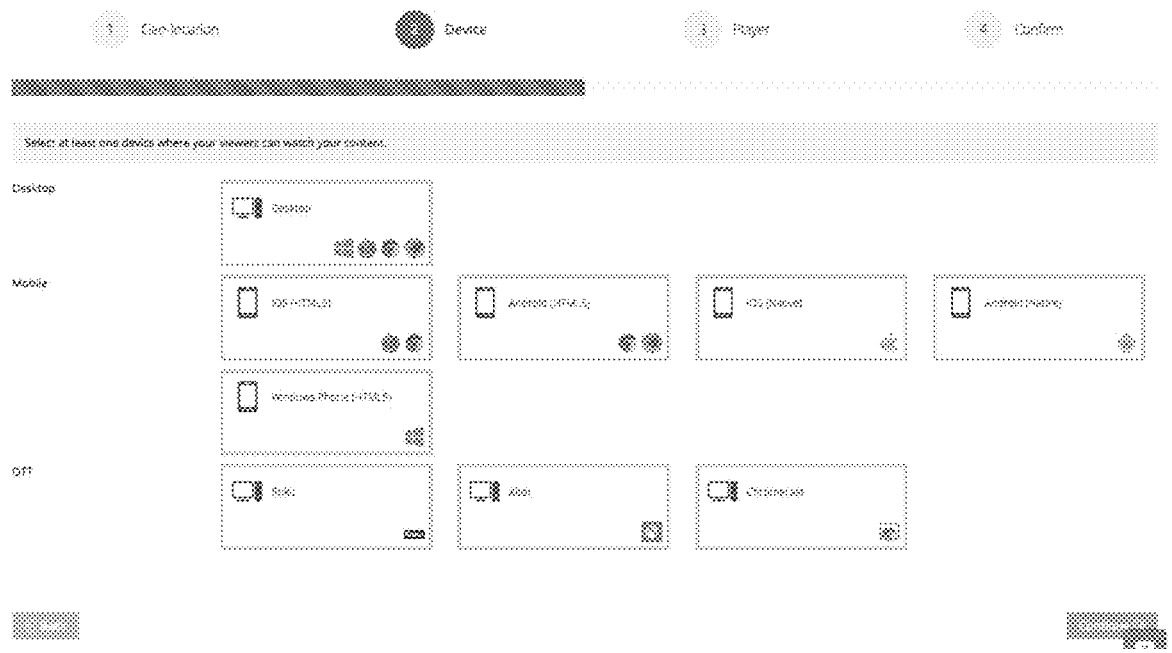
Pick Device    FIG. 12C Pick Player

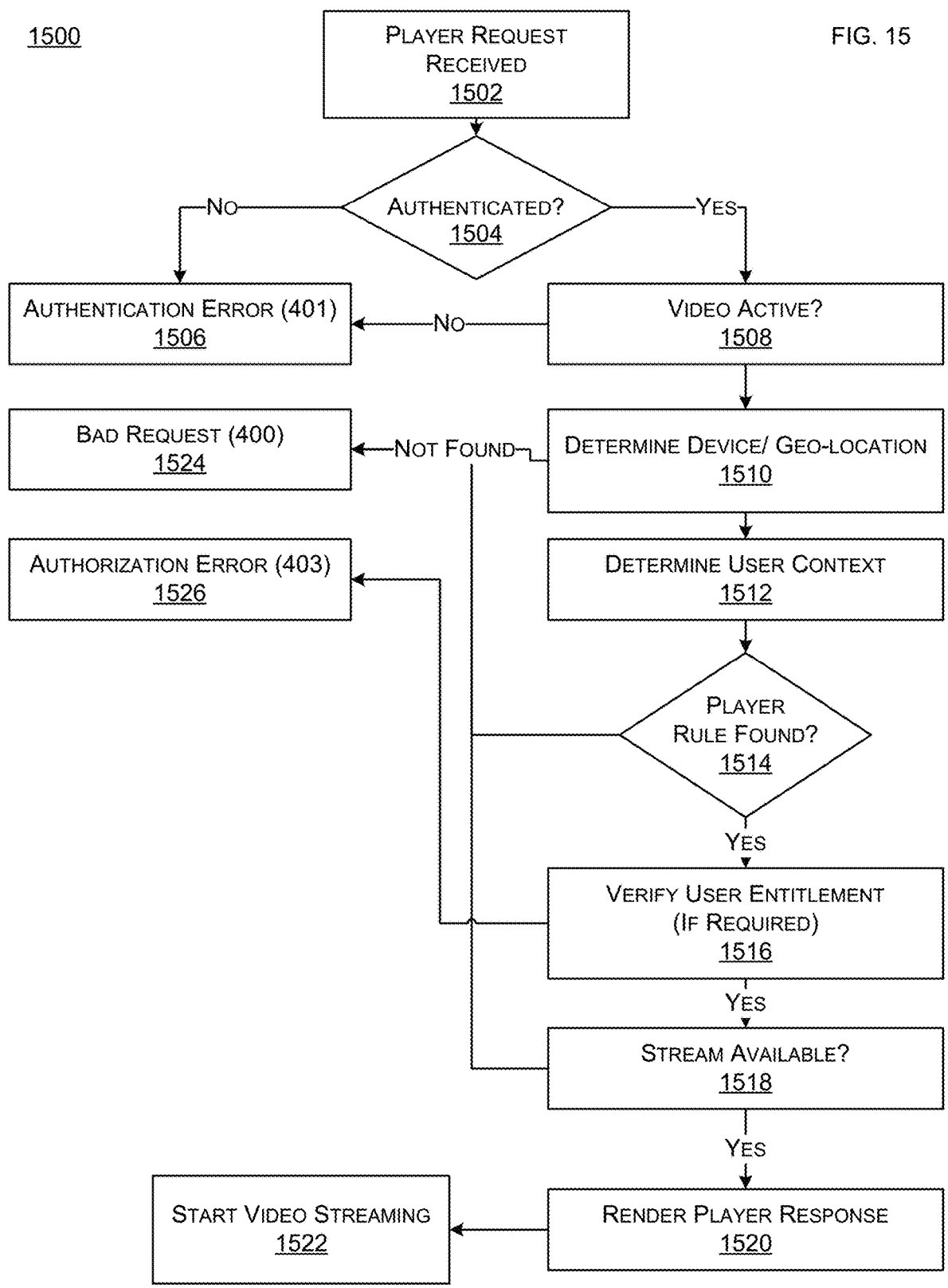

FIG. 16

PLAYER RULE 1602
- COUNTRIES (MULTIPLE)
- DEVICES (MULTIPLE)
- PLAYER (SINGLE)
- SUBSCRIPTION REQUIRED (BOOLEAN)
- THIRD PARTY DATA

VIDEO 1604
- TITLE
- DURATION
- DESCRIPTION
- DATA SOURCES

CONSUMER 1614
- EMAIL
- NAME
- STRIPE ID
- BRAINTREE ID
- SUBSCRIPTION ID (MULTIPLE)
- TRANSACTION ID (MULTIPLE)
- PASSWORD (HASHED)
- DEVICE PINS

SUBSCRIPTION 1616
- PLAN ID
- AMOUNT
- CURRENCY
- STRIPE ID
- INTERVAL
- INTERVAL COURT
- TRAIL PERIOD (DAYS)
- COUPON CODE
- DISCOUNT AMOUNT/PERCENT
- CONSUMER ID

TRANSACACTION 1618
- PLAN ID
- AMOUNT
- CURRENCY
- STRIPE ID
- VIDEO ID
- CONSUMER ID

DATA SOURCE (HULU) 1606
- HULU ID
- DURATION
- THUMBNAILS

DATA SOURCE (YOUTUBE) 1608
- YOUTUBE ID
- DURATION
- THUMBNAILS

DATA SOURCE (ZYPE) 1610
- STREAMS
- DURATION
- THUMBNAILS

DATA SOURCE (ZYPE LIVE) 1612
- STREAM NAME
- STARTED AT / ENDED AT
- THUMBNAILS

1600

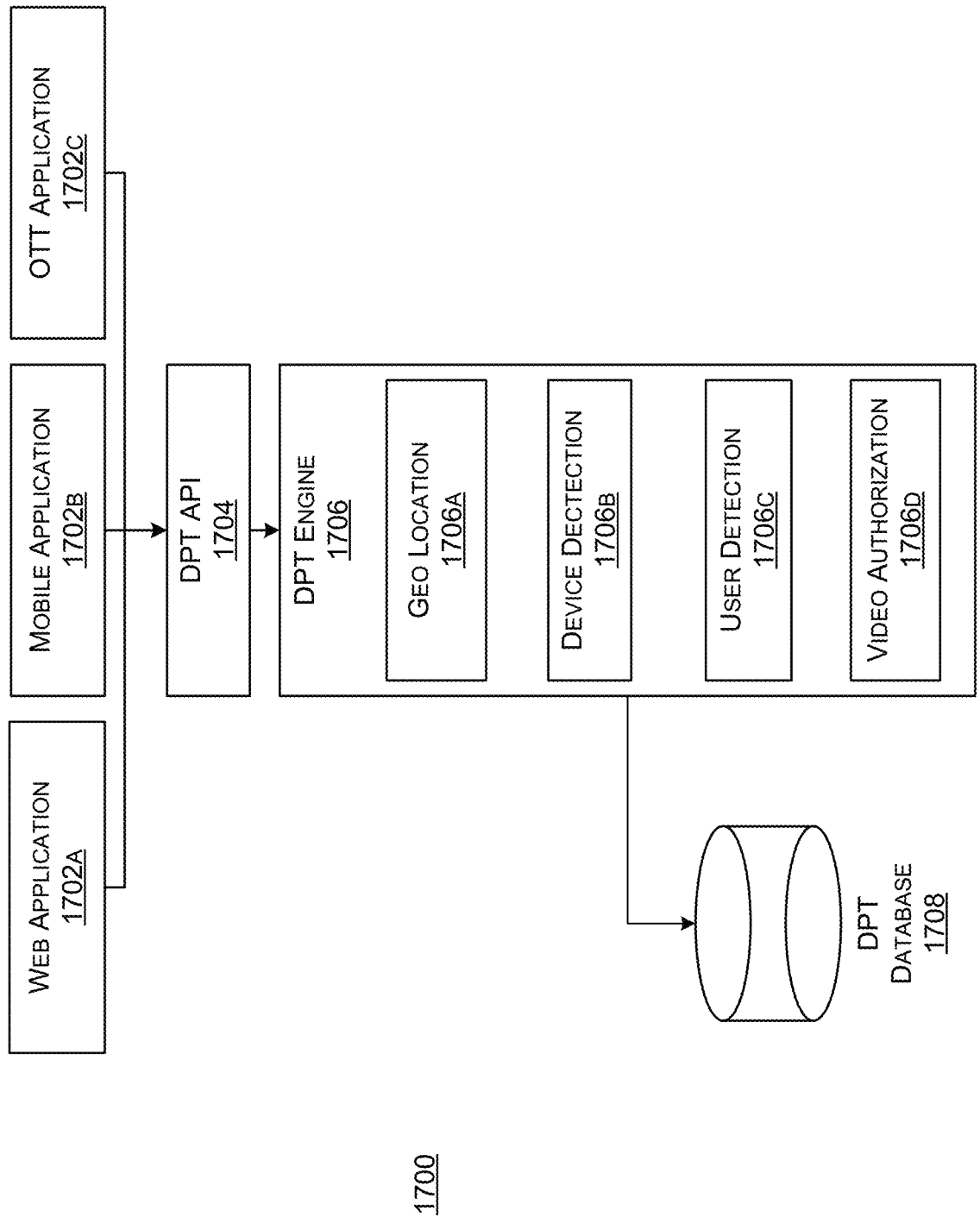

TECHNOLOGIES FOR ON-DEMAND CONTENT PLAYER SELECTION

CROSS-REFERENCE TO RELATED APPLICATIONS

This application is a Continuation of U.S. Non-Provisional application Ser. No. 15/067,588 filed 11 Mar. 2016, which claims a benefit of U.S. Provisional Application 62/133,099 filed 13 Mar. 2015, all of which are herein incorporated by reference for all purposes.

TECHNICAL FIELD

Generally, the present disclosure relates to computing. More particularly, the present disclosure relates to on-demand content player selection.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned with. Further, nothing is disclaimed.

Network-implemented video content services, whether subscription-based or ad-based, such as Hulu®, Netflix®, or YouTube®, host on-demand video content for consumer consumption. Although popular among publishers of the content, such as television networks, entertainment companies, or video studios, some of the services are unable to allow the publishers to deliver the content in manners customized based on consumer geolocation and device type, while minimizing consumer disruption. As network-connectivity becomes more widespread or globalized, an ability to provide such delivery capability to the publishers would be valuable due to more opportunities for monetization of the content.

Additionally, some of the services may not have streaming rights or delivery capabilities in some jurisdictions. Resultantly, the publishers may be missing out on potential monetization opportunities for the content. As the publishers face more pressure from investors to monetize the content, an ability to provide such streaming rights or delivery capabilities to the publishers would be valuable due to more opportunities for monetization of the content.

Accordingly, there is a desire to provide the publishers with an ability to deliver the content in manners customized based on consumer geolocation and device type, while minimizing consumer disruption and maximizing streaming rights or delivery capabilities.

SUMMARY

The present disclosure attempts to address the deficiencies of the conventional systems and methods. The present disclosure can also prove useful to other technical areas. Therefore, the claims should not be construed as necessarily limited to addressing any of the above.

In one embodiment, a method comprises receiving, via a first computer, over a network, a request for a content from a second computer. The method comprises determining, via the first computer, a characteristic of the second computer and a location of the second computer based at least in part on the request. The method comprises matching, via the first computer, the characteristic and the location against a rule accessible to the first computer. The method comprises selecting, via the first computer, a player based at least in part on the matching. The method comprises facilitating, via the first computer, a stream of the content via the player over the network to the second computer based at least in part on the selecting.

In one embodiment, a system comprises a server comprising an application programming interface configured to receive a request for a content over a network from a client. The server comprises an engine coupled to the application programming interface. The engine is configured to determine a characteristic of the client and a location of the client based at least in part on the request. The system comprises a database coupled to the engine. The database is configured to store a rule. The engine is configured to match the characteristic and the location against the rule. The engine is configured to select a player based at least in part on the match. The engine is configured to facilitate a stream of the content via the player over the network to the client based at least in part on the selection.

To the accomplishment of the above, this disclosure may be embodied in the form illustrated in the accompanying drawings. Attention is called to the fact, however, that the drawings are illustrative only. Variations are contemplated as being part of the disclosure, limited only by the scope of the claims.

BRIEF DESCRIPTION OF THE DRAWINGS

The accompanying drawings illustrate embodiments of the present disclosure. Such drawings are not to be construed as necessarily limiting the disclosure. Like numbers and/or similar numbering scheme can refer to like and/or similar elements throughout.

FIG. 6 shows a diagram of a data flow according to an embodiment of the present disclosure.

FIGS. 10A-10C show content player watermarks according to embodiments of the present disclosure.

FIGS. 12A-12E show interfaces for rule setting according to an embodiment of the present disclosure.

FIG. 15 shows a flowchart of a method for data flow according to an embodiment of the present disclosure.

FIG. 16 shows a diagram of a data representation according to an embodiment of the present disclosure.

FIG. 17 shows a diagram of a data flow according to an embodiment of the present disclosure.

DETAILED DESCRIPTION

Figure 1:
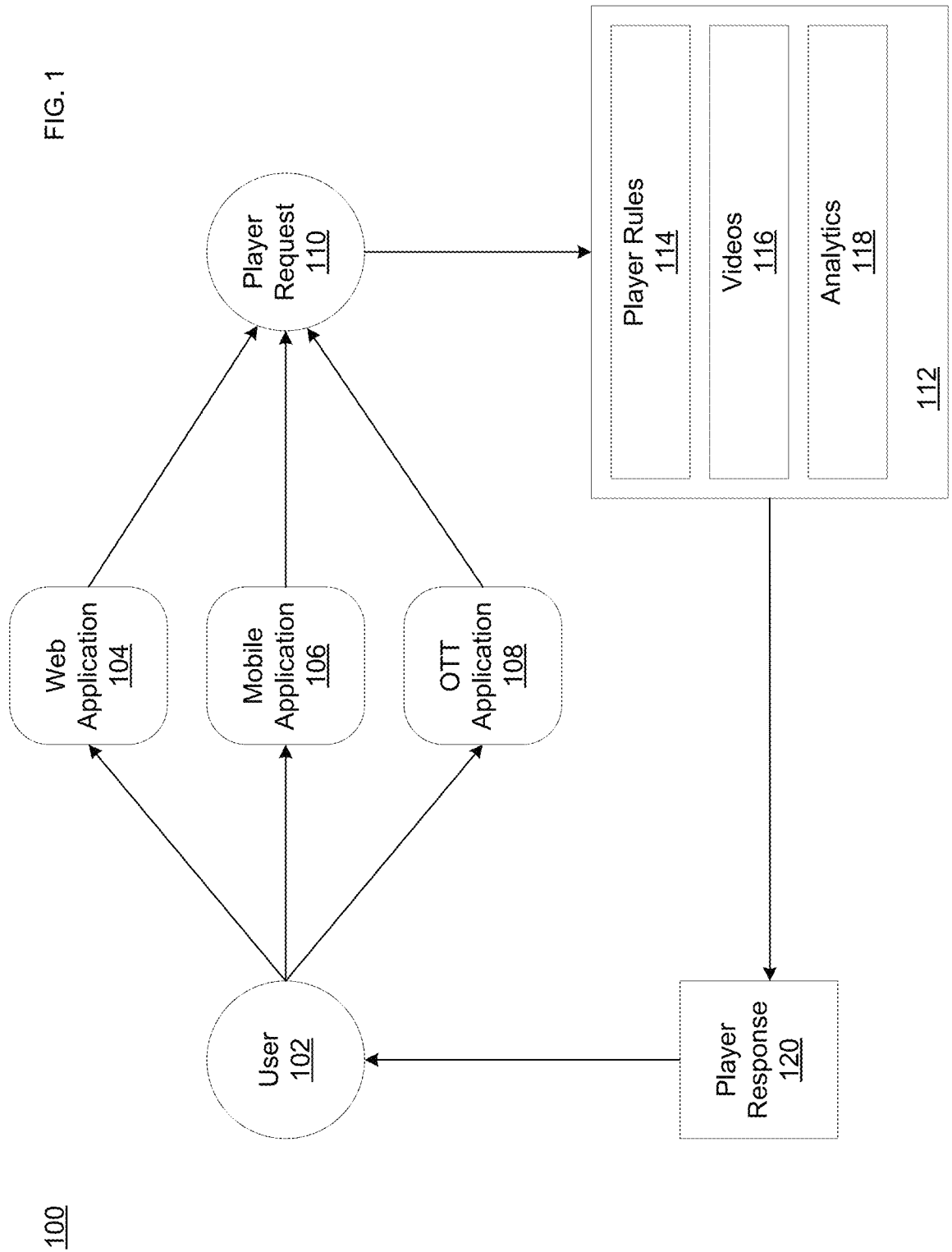
FIG. 1 shows a schematic diagram of a system process flow according to an embodiment of the present disclosure.

The present disclosure is now described more fully with reference to the accompanying drawings, in which embodiments of the present disclosure are shown. The present disclosure may, however, be embodied in many different forms and should not be construed as necessarily being limited to the embodiments disclosed herein. Rather, these embodiments are provided so that the present disclosure is thorough and complete, and fully conveys the concepts of the present disclosure to those skilled in the relevant art.

Features described with respect to certain embodiments may be combined and sub-combined in and/or with various other embodiments. Also, different aspects and/or elements of embodiments, as disclosed herein, may be combined and sub-combined in a similar manner as well. Further, some embodiments, whether individually and/or collectively, may be components of a larger system, wherein other procedures may take precedence over and/or otherwise modify their application. Additionally, a number of steps may be required before, after, and/or concurrently with embodiments, as disclosed herein. Note that any and/or all methods and/or processes, at least as disclosed herein, can be at least partially performed via at least one entity in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

Embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

As used herein, the term "about" and/or "substantially" refers to a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a schematic diagram of a system process flow according to an embodiment of the present disclosure. A system process flow 100 shows an end user 102, such as a human, operating a computer, such as a desktop computer, a tablet computer, a mobile phone, or a set-top computer. The computer runs or accesses a software application, such as a web application 104, a mobile application 106, or an over-the-top (OTT) application 108. The web application 104 can include any executable logic, which runs in a network-based client or a network browser, whether based on a virtual machine, a script, or an extension, such as via a client-server architecture when processing is server-based and remote to the computer. The mobile application 106 can include any executable logic, which runs on a mobile device, such as a mobile phone or a tablet computer. The OTT application 108 can include any executable logic, which runs on a computer to provide a network-based content independent of a network operator, such as a multiple system operator. In an embodiment, the software application can be an overlap or a combination of at least two of the web application 104, the mobile application 106, and the OTT application 108.

The computer runs the software application, such as the web application 104, the mobile application 106, or the OTT application 108, which outputs a player request 110 to play on-demand content. The player request 110 can be a message generated via a manual input, such as via a graphical user interface (GUI), or via the software application automatically, whether directly or indirectly. The player request 110 is communicated from the computer to a computer system 112 for processing upon receipt, such as in real-time. Note that although the content can be video content, other content or type of content is possible, whether additionally or alternatively, such as audio content or video game content.

The player request 110 can contain request information for a location of the computer operated by the user 102, such as a geolocation, a jurisdiction, a network location, a geofence, or a network type. The player request 110 can also contain request information for a device type of the computer operated by the user 102, such as a desktop computer, a mobile device, or a set-top computer. The player request 110 can also contain request information for an operating system (OS) type of the computer operated by the user 102, such as Android® or iOS®.

The computer system 112 includes a player rules unit 114, a video content unit 116, and an analytics unit 118, which can communicate with each other. In an embodiment, at least two of the player rules unit 114, the video content unit 116, and the analytics unit 118 are one unit. In an embodiment, at least one of the player rules unit 114, the video content unit 116, and the analytics unit 118 is remote from the computer system 112.

The player rules unit 114 can be embodied in hardware, software, or any combination thereof. For example, the player rules unit 114 can be logic or data embodied via a module, a data structure, or an engine. The player rules unit 114 is configured to receive a rule input, to generate a rule based on the rule input automatically, to apply the rule to the player request 110 automatically, and to output a result based on such application automatically. Note that any amount of rule input or rules is possible.

The rule input can be obtained manually, such as via a GUI, or automatically, whether directly or indirectly, such as via data extraction or a heuristic. In an embodiment, the rule input is provided via at least one of the user 102, a publisher of the content, an operator of the computer system 112, and an artificial intelligence component, which can be coupled to the computer system 112, such as via signal communication, which can be network-based, or running on the computer system 112. The rule input can contain rule information for a location, such as a geolocation, a geofence, a jurisdiction, a country, a jurisdiction, a geographic region, a network location, a network region, a network characteristic, a network quality, or a network type. The rule input can also contain rule information for a device characteristic. For example, the rule characteristic can include a device type, such as a desktop computer, a mobile device, or a set-top computer. For example, the rule characteristic can include an OS type, such as Android® or iOS®. For example, the rule characteristic can include a player type, whether OS native or application or browser based, such as Firefox® or Chrome®. For example, the rule characteristic can include a software application type, such as a mobile application or a desktop application. The rule input can also contain information for a player selection, such as YouTube® or Vimeo®. The rule generated based on the rule input can be stored locally or remotely, such as in a database accessible via the computer system 112. In an embodiment, the rule input includes an intellectual property licensing condition. For example, the database can be hosted on a database server. For example, the database can be a relational database, an in-memory database, or others.

The player rules unit 114 is configured to apply the rule to the player request 110 automatically and to determine automatically what content player to select based on such application. Such selection is based on a plurality of content players, which can correspond to a plurality of network-implemented video content services, where the content can be hosted on one or more of such services or on another data source. In an embodiment, one of such players can be a generic content player, which can be unassociated with one or more of such services, or a default player. The rule is applied to the player request via at least partially matching at least a part of the rule against at least a part of the player request. The result output based on such application includes a selection of a content player from the content players, such as a player identifier or a player name.

The video content unit 116 can be embodied in hardware, software, or any combination thereof. For example, the video content unit 114 can be logic or data embodied in a module, a data structure, or an engine. The video content unit 116 is configured to facilitate delivery of the content based on the selection of the content player via the player rules unit 114. Such facilitation can be based on content data accessible to or hosted via the video content unit 116. The content data can include information informative of a content title, a content duration, a content description, a content data source, or any other relevant content information. The information informative of the content data source can include a content data source identifier, a content duration, a content address, a content thumbnail, or any other content relevant information. For example, if the player rules unit 114 receives the player request 110 which is informative of the computer being an Android® phone located in Canada demanding a video A and the rule states that a mobile device located in Canada plays the video A through a player A, then the player rules unit 114 applies the rule to the player request 110 and outputs the result with the provision of the player A to the computer, whether directly or indirectly. The video content unit 116 then facilitates provision of the video A through the player A, such as via streaming.

The analytics unit 118 can be embodied in hardware, software, or any combination thereof. For example, the analytics unit 118 can be logic or data embodied in a module, a data structure, or an engine. The analytics unit 118 logs activity of the player rules unit 114 and the video content unit 116 and analyzes such activity for patterns. For example, the activity can be informative of a consumption event corresponding to the content or any characteristic relating to how the content is being consumed.

Resultantly, the computer system 112 outputs a player response 120, which is received by the user 102. The player response 120 includes a selection of the content player, as selected via the player rules unit 114. The computer system 112 facilitates a stream of the content to the user 102 to the content player based on the player response 120. The stream of the content is facilitated via the video content unit 116, such based on providing the content player with the content data, such as the content address. The content player retrieves the content based on the content data. Accordingly, the stream is output via the content player. In an embodiment, the computer system 112 serves the content to the content player.

In an embodiment, the computer system 112 is configured to allow video content to be served by unique players, from any source or a network based player, based on business rules for partnerships, language, delivery optimization, location, devices, and licensing, direct to end users. For example, such content service can be useful in a sports-based television blackout, where a home game cannot be televised locally if not sold out in a predetermined time period before start time. For example, such content service can also be useful in a sports where a team, such as a college basketball team, can make a deal with a franchise to broadcast in certain locations only. The computer system 112 is configured to allows video content consumption events to be tracked and reported on. The computer system 112 is configured to allows for customization of video players at two levels: a user interface (UI) level, via custom themes and watermarks, and a player syndication layer, which allows for third-party video players from sources, such as YouTube® or Hulu®, to be used as players in web, mobile, or OTT applications where possible, such as directly or simultaneously. The computer system 112 is configured to allow for optimization of revenue through at least two means. First, where a user's subscription status is evaluated to determine access to content, and if access to such content is granted, then a quality of content made available. Second, where a yield management system determines revenue optimization based on third-party integrations, such as ad network partners.

In an embodiment, the content includes a first content file hosted on a first content database and a second content file hosted on a second content database. The player selects at least one of the first content database and the second content database to play at least one of the first content file and the second content file based on the matching via the rule. Note that the player has access to at least one of the first content database and the second content database based on matching via the rule, such as via the computer system 112 authenticating the player for such access or setting a flag in at least one of the first content database and the second content database for such access.

Figure 2:
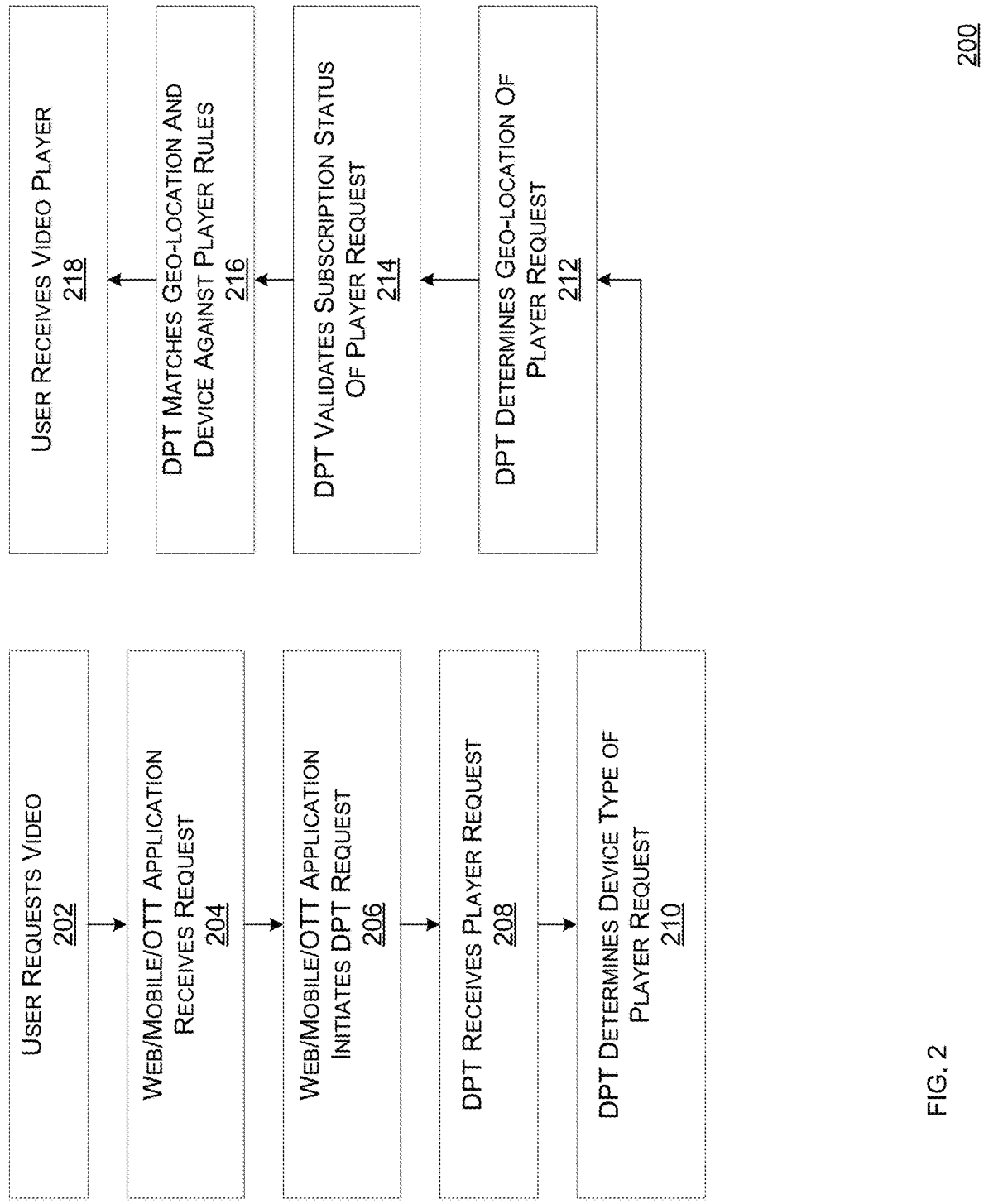
FIG. 2 shows a flowchart of a method for presenting content according to an embodiment of the present disclosure.

FIG. 2 shows a flowchart of a method for presenting content according to an embodiment of the present disclosure. Some concepts of shown this figure are described above. Therefore, any repetitive detailed description thereof will hereinafter be omitted or simplified in order to avoid complication.

A method 200 includes blocks 202-218. The method 200 is used to present content, such as based on FIG. 1.

In block 202, an end user, such as the user 102 in FIG. 1, places a request to access a video on-demand, such as the player request 110. The request is placed via the computer operated by the user, such as via a manual input.

In block 204, the computer runs the software application, such as the web application 104, the mobile application 106, or the OTT application 108 in FIG. 1. The software application receives the request. For example, an incoming video request can be made by an application programming interface (API), or directly from a client browser, native mobile application, or an OTT application.

In block 206, the software application initiates a dynamic player technology (DPT) request to a computer system, such as to the computer system 112 in FIG. 1, which runs a DPT service, such as via an engine. The DPT request requests the selection of the content player, such as described with reference to FIG. 1. The DPT request is communicated over a network, whether directly or indirectly. The DPT request includes at least device type information of the computer, such as a mobile device, and geolocation of the computer, such as a country.

In block 208, the DPT service receives the DPT request.

In block 210, the DPT service processes the DPT request to determine a type of the computer, such as a desktop computer, a tablet computer, a mobile phone, or a set-top computer.

In block 212, the DPT service processes the DPT request to determine the geolocation of the computer. Such geolocation can be obtained via a signal triangulation unit, whether terrestrial or satellite based, coupled to the computer. Alternatively or additionally, such geolocation can be obtained via a network address or self-disclosure, such as via a GUI or a message. Note that although the device type is determined before the geolocation, a reverse configuration is possible, where the device type is determined after the geolocation.

In block 214, the DPT service validates subscription status of the DPT request, which can be via metadata. Such validation is based on confirming that the software application, which initiated the DPT request, is authorized to access the video on-demand or place the DPT request. For example, such validating can be via a device signature, biometrics, profiles, or username/passwords. Note that a variation of quality of the content can be based on the subscription status, where the content is provided to a subscriber in higher quality than a non-subscriber. For example, the subscriber can be provided the content in a high quality and the non-subscriber in a medium quality or the subscriber is provided the content in the medium quality and the non-subscriber is provided the content in a quality degraded from the medium quality. For example, when the content is streamed, then the stream is in a first quality when the validating passes and the stream is in a second quality when the validating fails, with the first quality being better than the second quality, such as in resolution, speed, no ads, delivery customization, content resumption upon pause, color/grayscale, or others.

In block 216, the DPT service matches the type of the computer, from the block 210, and the geolocation of the computer, from the block 212, against a set of content player rules, such as via the player rules unit 114. Such rules are based on the rules input, as described in FIG. 1. For example, the DPT service evaluates metadata from the client browser, including the type of the computer, the geolocation of the computer, and an entitlements and/or a subscription status of computer.

In block 218, the DPT service outputs a result based on the block 216, where the user, such as the user 102 in FIG. 1, receives a video player and content can be provided to the video player, such as via streaming, based on available content sources.

In an embodiment, the DPT service is configured to periodically communicate with the player, such as via pinging or a status alert, so that if the geolocation changes, such as during travel, for instance in a vehicle, the player can change, which can be streamlined smoothly without disruption to consumer experience during content consumption. Alternatively or additionally, such functionality can also be utilized in network changes, whether between networks or along a network. For example, if the DPT service determines that network quality is reduced/degraded, then the DPT service can change the player or handover to another player, which can be in real-time, which can be streamlined smoothly without disruption to consumer experience during content consumption. Further, such changes can be based on network subscription, where a network with a lower subscription fee or lower bandwidth limit results in one player and a network with a higher subscription fee or higher bandwidth limit results in another player, with the players differing based on bandwidth consumption/utilization.

In an embodiment, the DPT service is configured to provided lower quality content or player if the user is not subscribed. Alternatively or additionally, the DPT service can be configured to provide ads within the content if the user is not subscribed.

Figure 3:
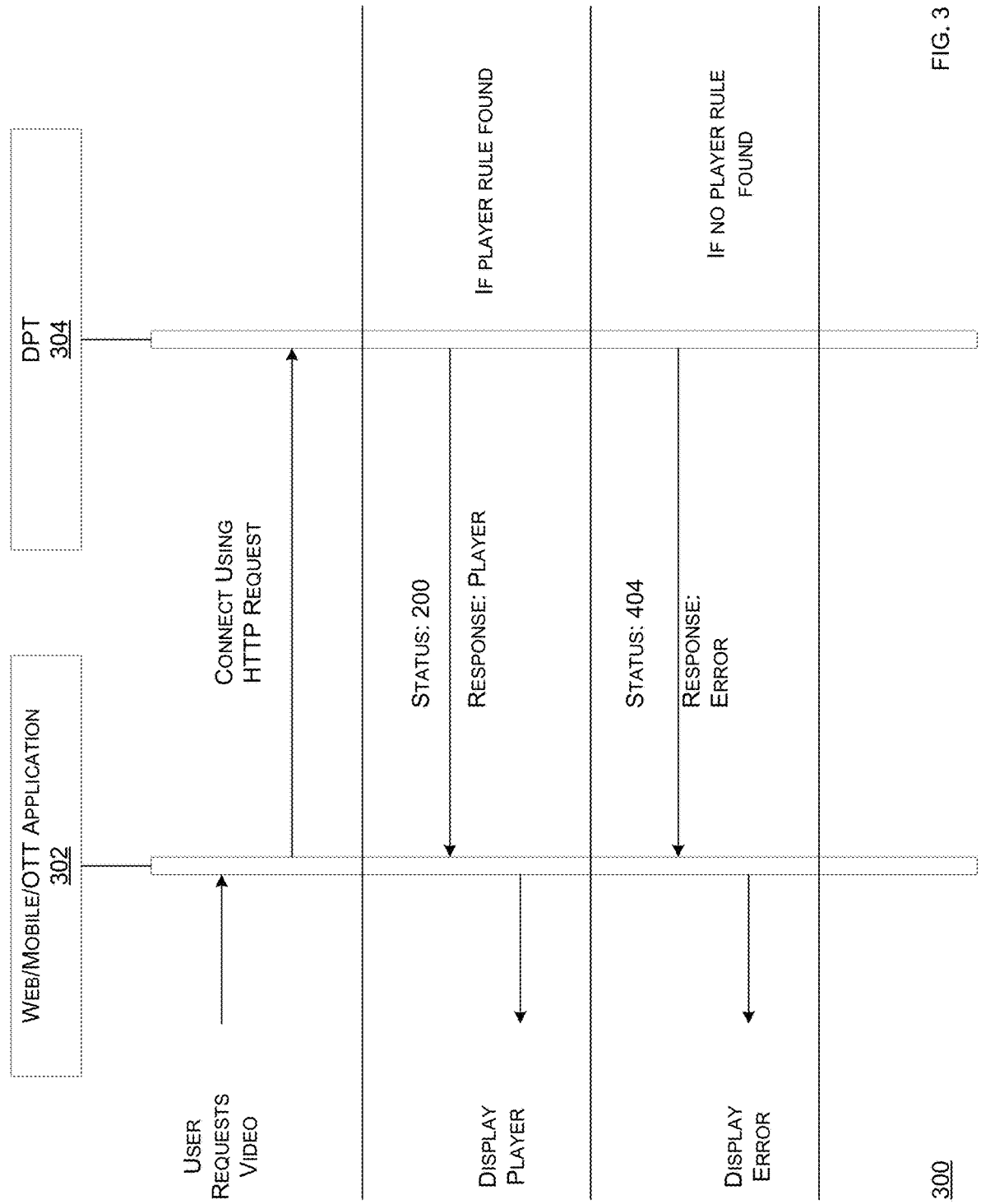
FIG. 3 shows a sequence diagram for presenting content according to an embodiment of the present disclosure.

FIG. 3 shows a sequence diagram for presenting content according to an embodiment of the present disclosure. Some concepts of shown this figure are described above. Therefore, any repetitive detailed description thereof will hereinafter be omitted or simplified in order to avoid complication.

A sequence diagram 300, such as based on FIG. 1 or FIG. 2, shows a software application 302, such as the web application 104, the mobile application 106, or the OTT application 108 of FIG. 1, receives a request from a user, such as the user 102, for a video on-demand. The software application connects to a DPT engine 304 via a Hypertext Transfer Protocol (HTTP) request, but other types of network communication are possible, such as HTTPS or others. If the DPT engine 304 is able to identify and to apply a rule, such as the rule described in reference to FIG. 1, then the DPT engine 304 responds with a relevant player to the software application 302 based on the application of the rule such that the user is able to access the player. However, if the DPT engine 304 is not able to identify the rule, then the DPT engine 304 responds with an error message to the software application 302 such that the user is able to access the error message.

Figure 4:
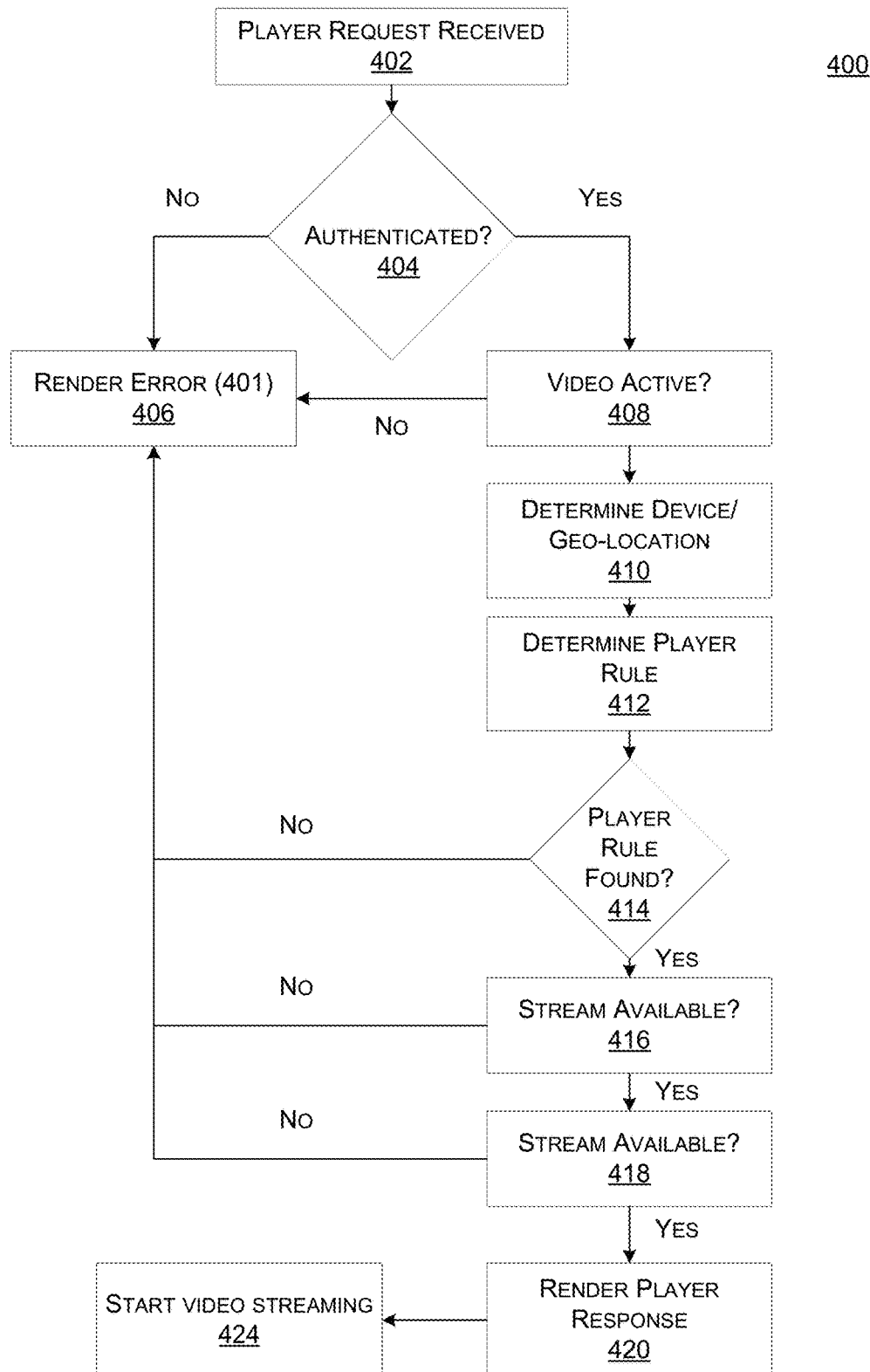
FIG. 4 shows a flowchart of a method for data flow according to an embodiment of the present disclosure.

FIG. 4 shows a flowchart of a method for data flow according to an embodiment of the present disclosure. Some concepts of shown this figure are described above. Therefore, any repetitive detailed description thereof will hereinafter be omitted or simplified in order to avoid complication.

A method 400 includes blocks 402-424. The method 400 is used to flow data, such as based on FIG. 1 or FIG. 2.

In block 402, a DPT engine receive a player request for a video, such as described in reference to FIG. 1.

In block 404, the DPT engine ensures that the player request is authenticated appropriately, such as from an authenticated computer. For example, if the DPT engine is configured to allow for open access, then most requests will pass this authentication check and block 408 will be performed. Otherwise, block 406 is performed, where an error is rendered.

In block 408, the DPT engine evaluates a status of the video being requested via the player request. Such evaluation of the status is to determine if the video is active or has inactive, such as taken down. If the video is inactive, the block 406 is performed. Otherwise, block 410 is performed.

In block 410, the DPT engine determines device information and geolocation information based on the player request, such as described in reference to FIG. 1.

In block 412, the DPT engine determines, such as via searching, if a player rule exists, such as described in reference to FIG. 1.

In block 414, the DPT engine finds the rule. Otherwise, block 406 is performed.

In block 416, the DPT engine applies the rule to the player request based on device type, as described in reference to FIG. 1. Otherwise, block 406 is performed.

In block 418, the DPT engine applies the rule to the player request based on geolocation, as described in reference to FIG. 1. Otherwise, block 406 is performed.

In block 420, the DPT engine renders a player response, as described in reference to FIG. 1. Note that where "global" and "any device" are available as rules, the best matching player will be returned.

In block 424, the DPT engine facilitates video streaming based on the player response, as described in reference to FIG. 1.

Figure 5:
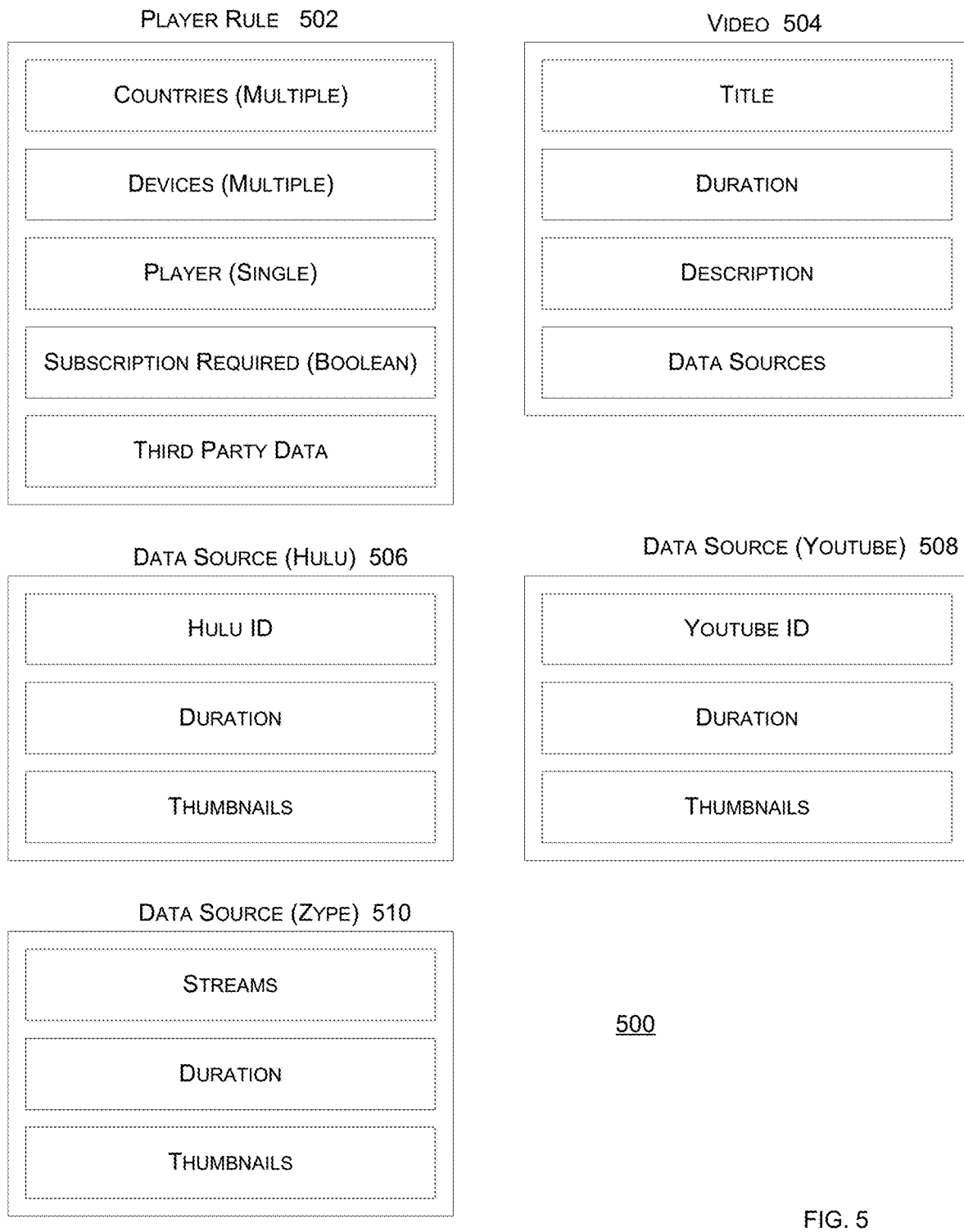
FIG. 5 shows a diagram of a data representation according to an embodiment of the present disclosure.

FIG. 5 shows a diagram of a data representation according to an embodiment of the present disclosure. Some concepts of shown this figure are described above. Therefore, any repetitive detailed description thereof will hereinafter be omitted or simplified in order to avoid complication.

A data representation 500 includes a player rule set 502, which allows for a setting of a rule based on geographic data, such as a country or a region, whether single or multiple. The player rule set 502 allows for a setting of a rule based on device data, such as a browser type, a set-top computer, or a mobile device, whether single or multiple. The player rule set 502 allows for a setting of a rule based on a content player, such as a YouTube® player, a generic player, a customized player, a set-top native player, which can be single only. The player rule set 502 allows for a setting of a rule for confirming a subscription requirement, such as a Boolean or a true/false value. The player rule set 502 allows for a setting of a rule for any third party data configured for evaluation.

The data representation 500 includes video data 504, which includes a title of a video, a duration of the video, a description of the video or any related metadata, such as actors, characters, or other data that may be assigned, and data source for the video. Note that the DPT engine, such as described in reference to FIGS. 2-3, can aggregates content from third-party sources, such as Hulu® or YouTube® or media files directly uploaded to the DPT engine.

The data representation 500 includes data source information 506, 508, and 510, which include information relevant to each aggregation point. For example, Hulu® or YouTube® sources contain a set of identifying information to access and synchronize content from those sources. However, where authentication is required, the DPT engine has access to or stores and authenticate based on data source information 506, 508 to those systems on an as needed basis.

FIG. 6 shows a diagram of a data flow according to an embodiment of the present disclosure. Some concepts of shown this figure are described above. Therefore, any repetitive detailed description thereof will hereinafter be omitted or simplified in order to avoid complication.

A data flow 600 shows a software application 602 communicating with a DPT API 604. The DPT API 604 communicates with a DPT engine 606, which is software based. The DPT engine 606 retrieves data from a DPT database 608, which stores the rules, as described in reference to FIG. 1. The software application 602, such as the web application 104, the mobile application 106, or the OTT application 108 in FIG. 1, sends a request for a video player onto the DPT API 604, which communicates the request to the DPT engine 606 for processing via applying the rules from the database 608 to the request. Note that the software application 602 is authorized to make a request to the DPT API 604. The DPT API 604 is a web service which manages such requests. The DPT engine 606 processes such requests. The database 608 contains any configuration information, including video metadata and rules, to process requests. The database 608 can be relational or post-relational.

Figure 7B:
FIGS. 7A-7B show content player screenshots according to embodiments of the present disclosure.
Figure 7A:
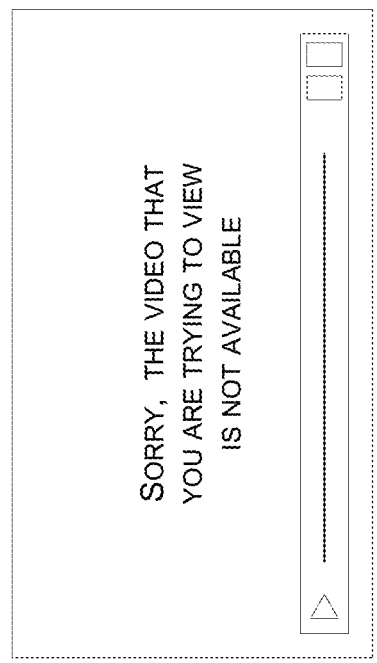

FIGS. 7A-7B show content player screenshots according to embodiments of the present disclosure. Some concepts of shown this figure are described above. Therefore, any repetitive detailed description thereof will hereinafter be omitted or simplified in order to avoid complication.

FIG. 7A shows a default content player message where a video player cannot be served or a video cannot be served. FIG. 7B shows a customized content player message where a video player cannot be served or a video cannot be served. Whether alternatively or additionally to such message, the user can also be redirected to subscribe, purchase, or watch related content.

Figure 8:
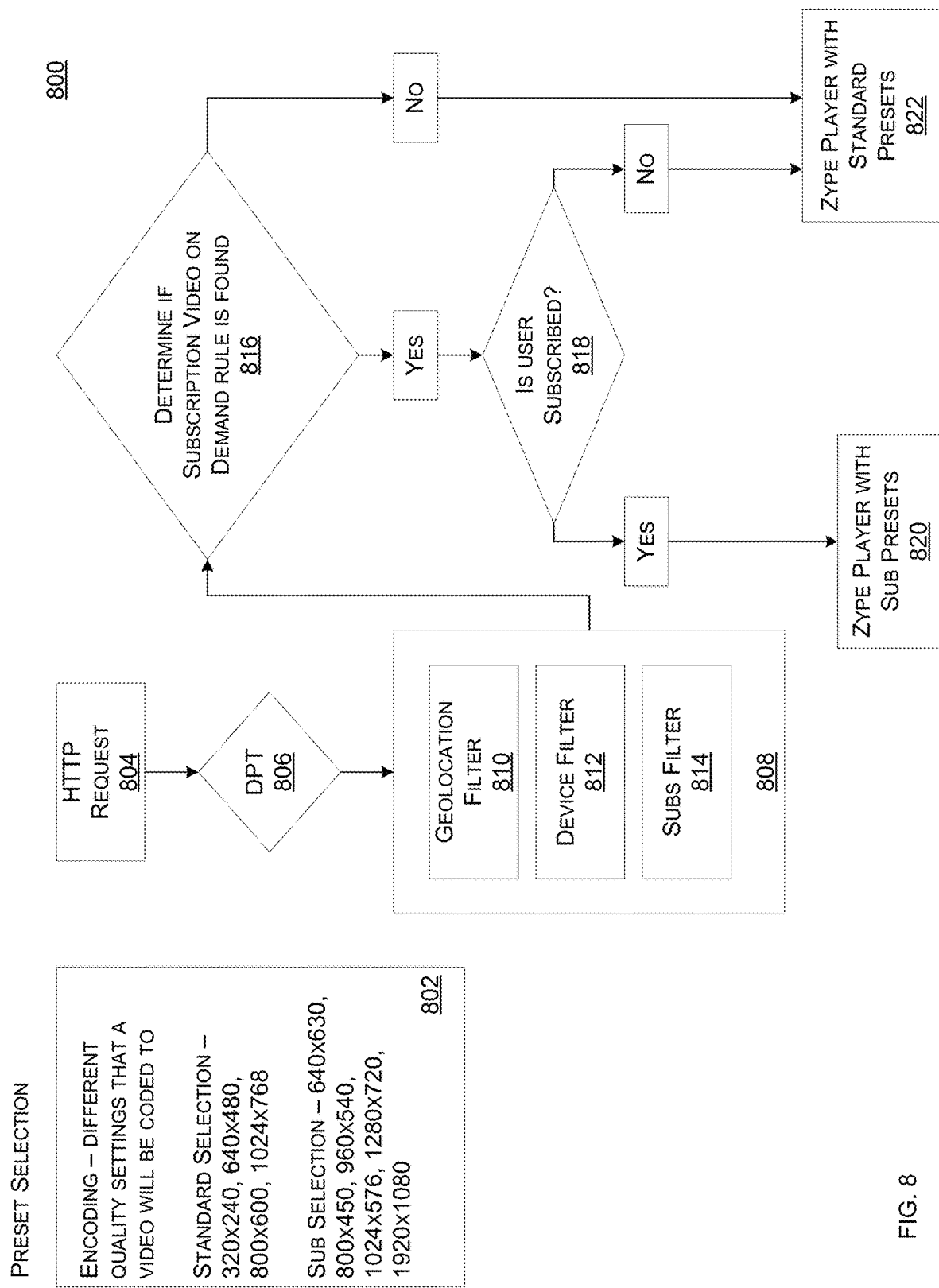
FIG. 8 shows a flowchart of a method for content selection according to an embodiment of the present disclosure.

FIG. 8 shows a flowchart of a method for content selection according to an embodiment of the present disclosure. Some concepts of shown this figure are described above. Therefore, any repetitive detailed description thereof will hereinafter be omitted or simplified in order to avoid complication.

A method 800 includes blocks 8004-822. The method 800 is used to select content, such based on presentation quality. Note that block 802 shows various encoding settings for a video, such as a standard selection and a sub selection. Note that the sub selection has a higher resolution quality than the standard selection.

In block 804, an HTTP request is communicated to a DPT engine, such as described in reference to FIG. 3. The request is for a player to play video on-demand.

In block 806, the DPT engine receives the request.

In block 808, the DPT engine employs a filtering unit 808, such as the player rules unit 114. The filter unit 808 accesses or contains a geolocation filter 810, a device filter 812, and a subscription filter 814, which filter the request as described in reference to FIGS. 1-3. For example, such filtering can be via matching a set of rules against the request, such as the geolocation, whether a region, such as North America, or a jurisdiction, like China, of the computer against the set of rules, the type of the computer, such as a mobile device running Android®, against the rules, and whether the computer is associated with a valid subscription.

In block 816, the DPT engine determines if a subscription video on-demand rule is found. Such rule allows for gating content based on video quality. Note that such rule is content based and in some instances can be content player based as well. If not, then block 822 is performed where a generic player plays the video in accordance with the standard selection. Otherwise, block 818 is performed.

In block 818, the DPT engine determines if the subscription video is enabled for the computer placing the HTTP request. If not, then block 822 is performed where the generic player plays the video in accordance with the standard selection. Otherwise, block 820 is performed, where the generic player plays the video in accordance with the sub selection.

In an embodiment, where a video source supports direct access to underlying stream, such as a video transcoded by the computer system 112, as described in reference to FIG. 1, or a video already transcoded and on a third-party content-delivery network (CDN), a video uploaded to a network-implemented content sharing platform, such as Vimeo®, the computer system 112 is configured to evaluate the rules for the player in a context of the user's location, device, and subscription settings and render a high quality or lower quality video stream, such as for allowing content owners to gate content based on video quality. For example, at least one of a first content stream and a second content stream can be provided to the player, with the first content stream being in better content quality than the second content stream and at least one of the first content stream and the second content stream is based on the content via the underlying stream.

Figure 9B:
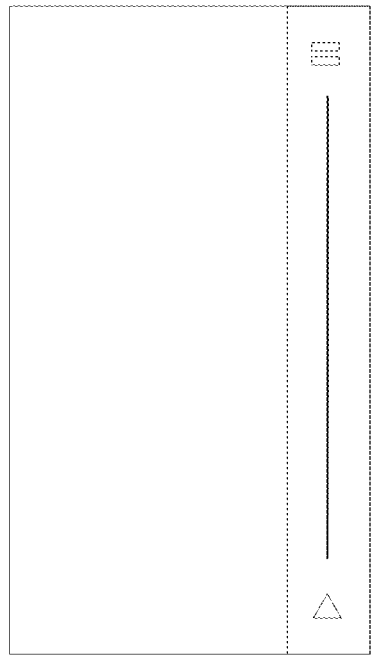
FIGS. 9A-9B show content player customizations according to embodiments of the present disclosure.
Figure 9A:
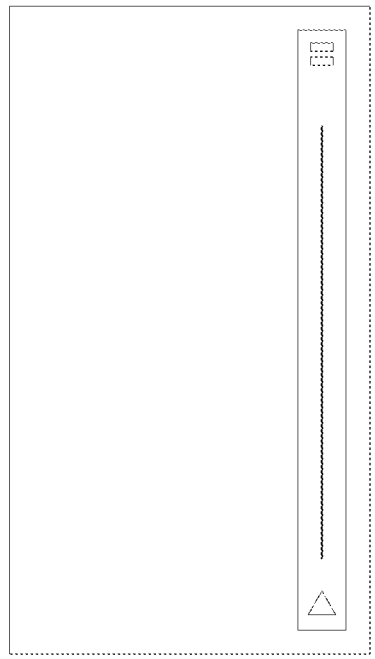

FIGS. 9A-9B show content player customizations according to embodiments of the present disclosure. Some concepts of shown this figure are described above. Therefore, any repetitive detailed description thereof will hereinafter be omitted or simplified in order to avoid complication.

FIGS. 9A-9B show a custom visual theme element that can be configured in a content player, whether generic player or branded. In FIG. 9A, the player contains a player bar, which is rendered over the content, such as via hovering, whether persistently or upon mouse-overs. FIG. 9B shows the player bar rendered under the content, such as a static bar or a mouse-over. Note that such over or under player bar functionality is enabled via the player, such as based on the computer system 112. Also, such over or under player bar functionality or various themes can be configured to display based on player rules, as outlined herein.

FIGS. 10A-10C show content player watermarks according to embodiments of the present disclosure. Some concepts of shown this figure are described above. Therefore, any repetitive detailed description thereof will hereinafter be omitted or simplified in order to avoid complication.

FIG. 10A shows a custom watermark element rendered in top right corner via a player, as described in reference to FIGS. 1-2. FIG. 10B shows a player with no watermark by default. In an embodiment, the player can render a watermark element by default. Such watermark element can be customized. FIG. 10C shows a custom watermark element rendered in top left corner via the player, as described in reference to FIGS. 1-2.

Note that what image is contained in the watermark element, how the image is presented in the watermark element, a position of the image in the watermark element, where the watermark element is presented in the player, how the watermark element is presented in the player, what watermark element type or any other watermark element characteristic can be configured to display based on player rules, as outlined above, via the player.

Figure 11:
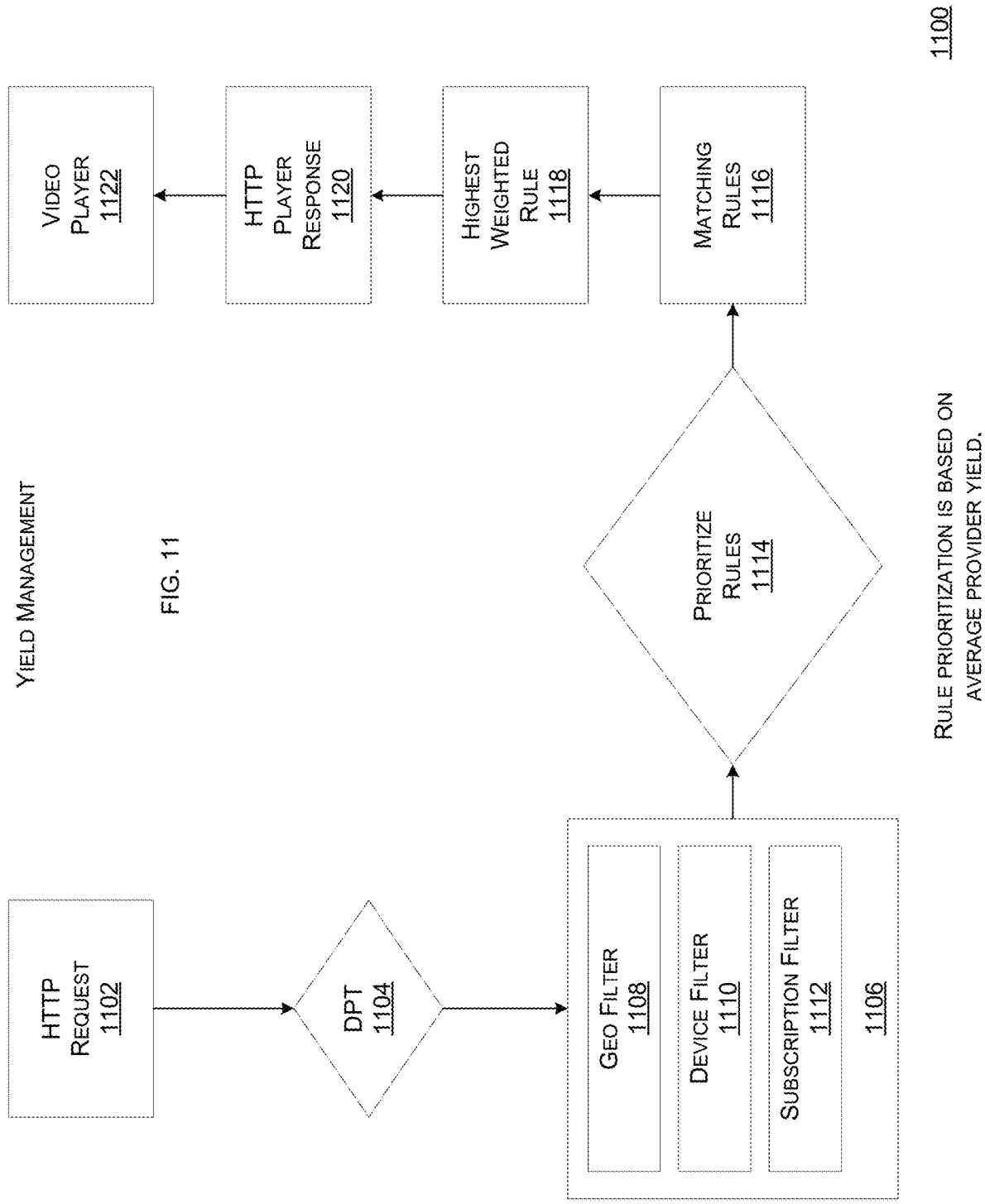
FIG. 11 shows a flowchart of a method for yield management according to an embodiment of the present disclosure.

FIG. 11 shows a flowchart of a method for yield management according to an embodiment of the present disclosure. Some concepts of shown this figure are described above. Therefore, any repetitive detailed description thereof will hereinafter be omitted or simplified in order to avoid complication.

A method 1100 includes blocks 1102-1122. The method 1100 is used to manage yield based on rule prioritization. Such management allows a computer system, such as the computer system 112, as described in reference to FIG. 1, to be used to optimize revenue streams. More specifically, each video provider (based on video source) is assigned a provider yield factor, such as 0.2, 0.4, or 0.8. These factors can be set manually, or automatically updated based on the revenue stream partners' available data.

In block 1102, an HTTP request is communicated to a DPT engine, such as described in reference to FIG. 3. The request is for a player to play video on-demand.

In block 1104, the DPT engine receives the request.

In block 1106, the DPT engine employs a filtering unit, such as the player rules unit 114. The filter unit accesses or contains a geolocation filter 1108, a device filter 1110, and a subscription filter 1112, which filter the request as described in reference to FIGS. 1-3. For example, such filtering can be via matching a set of rules against the request, such as the geolocation, whether a region, such as North America, or a jurisdiction, like China, of the computer against the set of rules, the type of the computer, such as a mobile device running Android®, against the rules, and whether the computer is associated with a valid subscription.

In block 1114, the DPT engine determines that at least two rules conflict or more than one rule is applicable. Accordingly, the DPT engine, based on the yield factor, prioritizes rules to display a revenue-optimized player to the user.

In block 1116, the DPT engine matches the prioritized rules. Such matching can be as described in reference to FIG. 1. Note that the matching occurs after yield management processing so as to maximize revenue.

In block 1118, the DPT engine outputs a result based on the matching.

In block 1120, the DPT engine outputs a player response, as described in reference to FIG. 1.

In block 1122, the video player is provided.

In an embodiment, a computer, such as the computer system 112, as described in reference to FIG. 1, a first yield factor is stored which corresponds to the first player and a second yield factor is stored which corresponds to a second player, with the first yield factor is different from the second yield factor in value. A conflict between the first rule and a second rule is identified. One of the first rule and the second rule is selected based at least in part on the conflict and based at least in part on one of the first yield factor and the second yield factor such that one of the first player and the second player is selected based at least in part on one of the first yield factor and the second yield factor being greater in value, with the matching being based at least in part on one of the first rule and the second rule. Note that at least one of the first yield factor and the second yield factor can be set manually, such as via a GUI. Also note that at least one of the first yield factor and the second yield factor can be set automatically based on a communication with a data source associated with at least one of the first player and the second player, such as a network-implemented video content service.

FIGS. 12A-12E show interfaces for rule setting according to an embodiment of the present disclosure. Some concepts of shown this figure are described above. Therefore, any repetitive detailed description thereof will hereinafter be omitted or simplified in order to avoid complication.

Figure 12D:
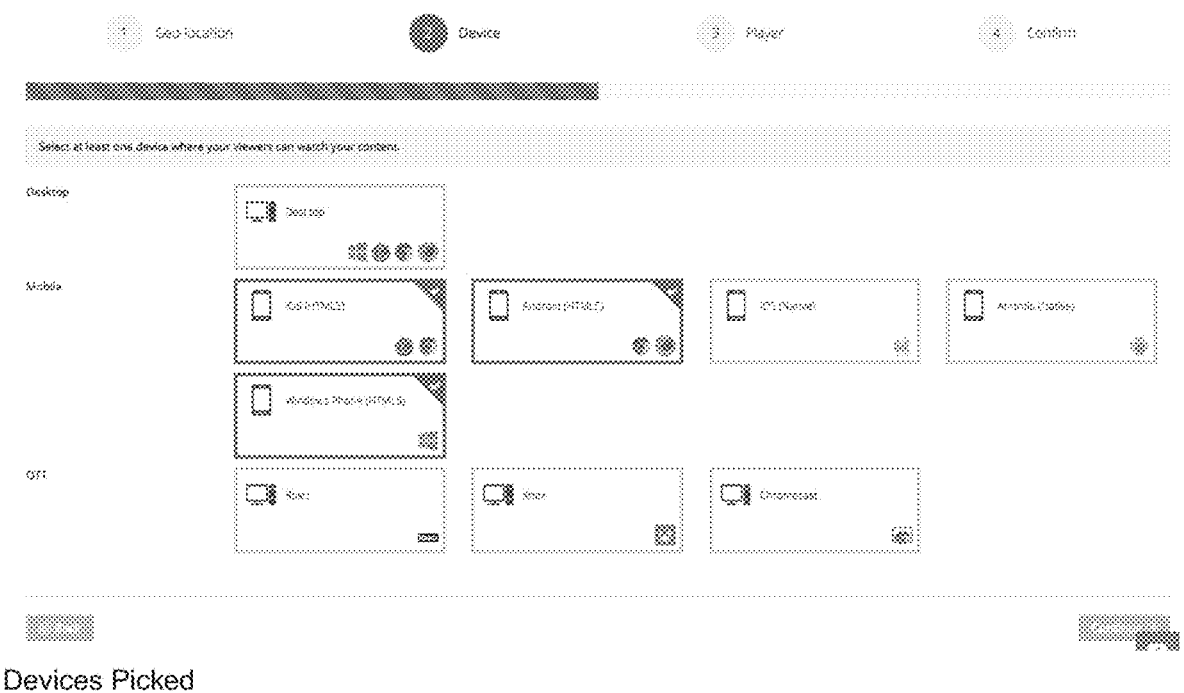

FIGS. 12A-12E show user interfaces in accordance with FIGS. 1-3. In FIG. 12A, a user interface, such as a summary screen, shows that a user set four rules based on various geolocations, device types, and player types. Note that the four rules are active. The geolocations are countries. The rules apply to a library of videos, such as of the publisher. Note that the rules can apply to one or more videos in the library, as defined via metadata, categories, or tags. Note that global selection can be made.

Figure 12E:
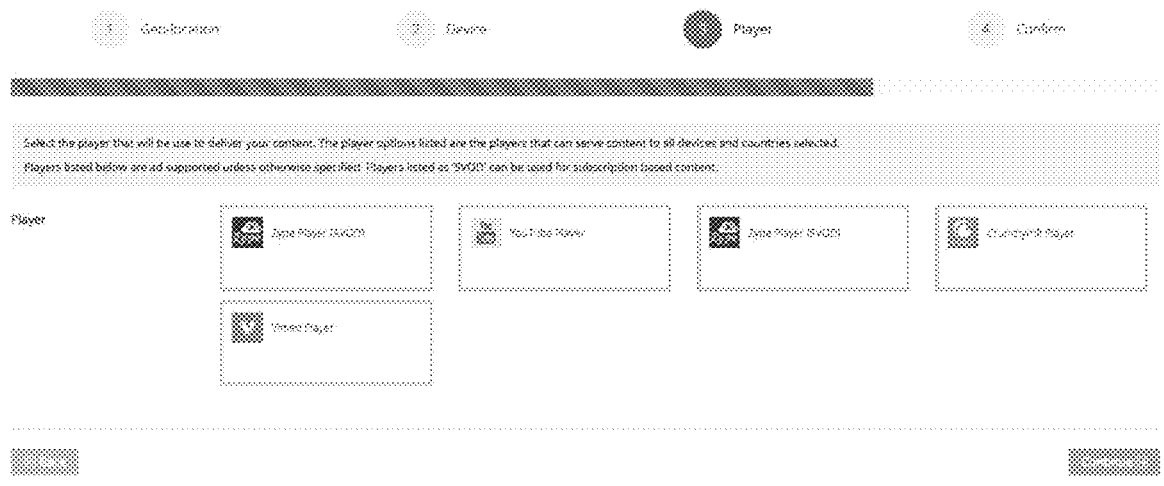

FIGS. 12B-12E show a user interface during progression via a rule creation process. In FIG. 12B, a geolocation is about to be selected via a user, such as via dragging a country selection from a left column to a right column. For example, the geolocation includes a country, such as Spain. In FIG. 12C, a device is provided for selection via a user. For example, the device can be a desktop computer, a mobile device, or an OTT device. Note that for some of the devices the user can select an OS or a browser type or a native client. In FIG. 12D, the device is selected via a user, such as via a highlighted border, which is activated by selecting or clicking. Note that only certain types of mobile device were selected, while the desktop computer and the OTT device are unselected. In FIG. 12E, a player is selected via a user. Note that the players listed are automatically provided for selection based on the geolocation selection and the device selection.

Figure 13:
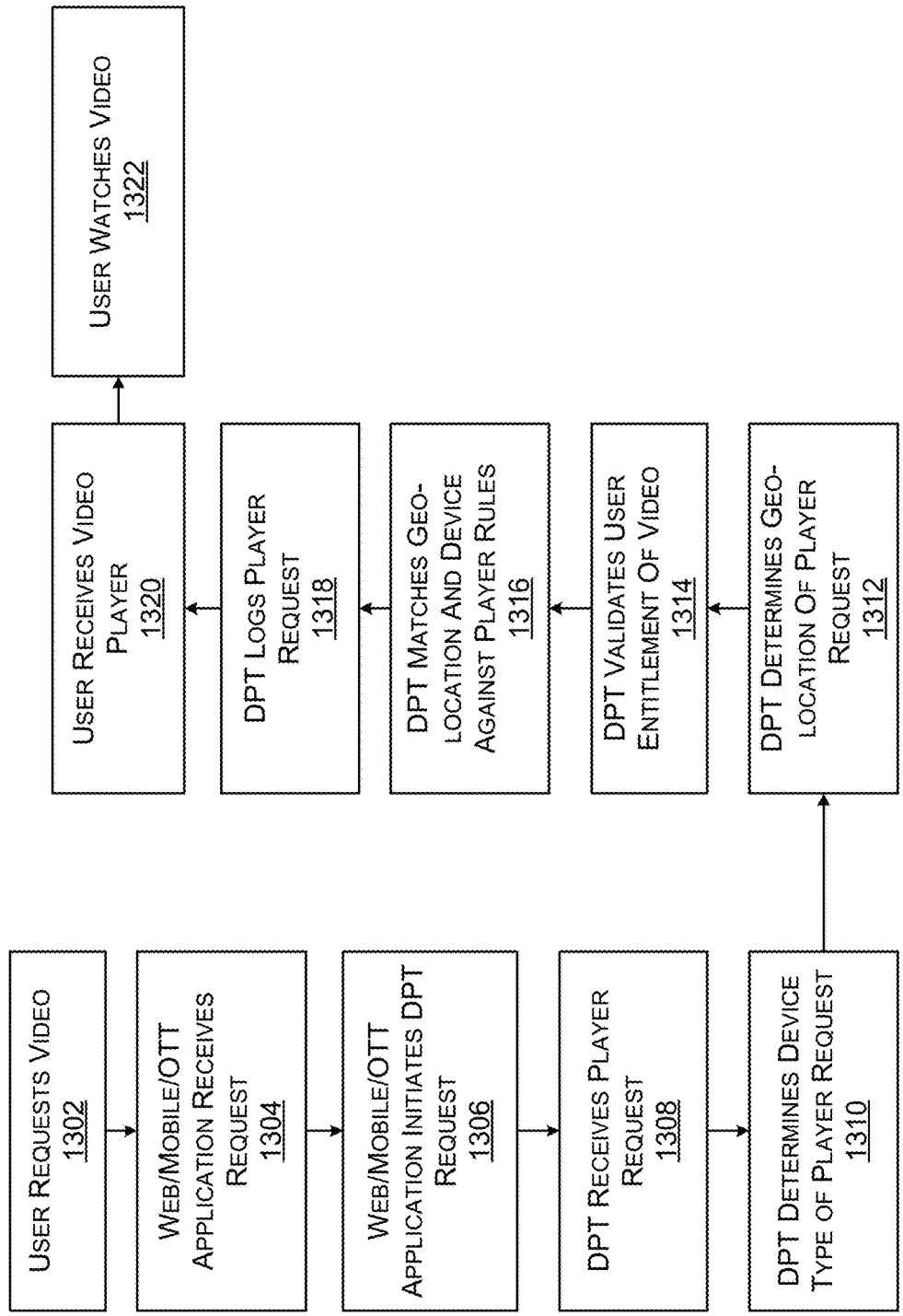
FIG. 13 shows a flowchart of a method for presenting content according to an embodiment of the present disclosure.

FIG. 13 shows a flowchart of a method for presenting content according to an embodiment of the present disclosure. Some concepts shown in this figure are described above. Therefore, any repetitive detailed description thereof will hereinafter be omitted or simplified in order to avoid complication.

A method 1300 includes blocks 1302-1322. The method 1300 is used to present content, such as based on FIG. 1.

In block 1302, an end user, such as the user 102 in FIG. 1, places a request to access a video on-demand, such as the player request 110. The request is placed via the computer operated by the user, such as via a manual input.

In block 1304, the computer runs the software application, such as the web application 104, the mobile application 106, or the OTT application 108 in FIG. 1. The software application receives the request. For example, an incoming video request can be made by an API, or directly from a client browser, native mobile application, or an OTT application.

In block 1306, the software application initiates a dynamic player technology (DPT) request to a computer system, such as to the computer system 112 in FIG. 1, which runs a DPT service, such as via an engine. The DPT request requests the selection of the content player, such as described with reference to FIG. 1. The DPT request is communicated over a network, whether directly or indirectly. The DPT request includes at least device type information of the computer, such as a mobile device, and geolocation of the computer, such as a country.

In block 1308, the DPT service receives the DPT request.

In block 1310, the DPT service processes the DPT request to determine a type of the computer, such as a desktop computer, a tablet computer, a mobile phone, or a set-top computer.

In block 1312, the DPT service processes the DPT request to determine the geolocation of the computer. Such geolocation can be obtained via a signal triangulation unit, whether terrestrial or satellite based, coupled to the computer. Alternatively or additionally, such geolocation can be obtained via a network address or self-disclosure, such as via a GUI or a message. Note that although the device type is determined before the geolocation, a reverse configuration is possible, where the device type is determined after the geolocation.

In block 1314, the DPT service validates a user entitlement of the video, which can be via metadata. Note that the user entitlement of the video can apply to a purchase of the video, rental of the video, or a subscription of the video. Such validation is based on confirming that the software application, which initiated the DPT request, is authorized to access the video on-demand or place the DPT request based on the user entitlement to the video. For example, such validating can be via a device signature, biometrics, profiles, or username/passwords. Note that a variation of quality of the content can be based on the user entitlement of the video, where the content is provided to an entitled user in higher quality than a non-entitled user. For example, the entitled user can be provided the content in a high quality and the non-entitled user in a medium quality or the entitled user is provided the content in the medium quality and the non-entitled user is provided the content in a quality degraded from the medium quality. For example, when the content is streamed, then the stream is in a first quality when the validating passes and the stream is in a second quality when the validating fails, with the first quality being better than the second quality, such as in resolution, speed, no ads, less ads, different, ads, delivery customization, content resumption upon pause, color/grayscale, or others.

In block 1316, the DPT service matches the type of the computer, from the block 1310, and the geolocation of the computer, from the block 1312, against a set of content player rules, such as via the player rules unit 114. Such rules are based on the rules input, as described in FIG. 1. For example, the DPT service evaluates metadata from the client browser, including the type of the computer, the geolocation of the computer, and an entitlements and/or a subscription status of computer.

In block 1318, the DPT service logs the player request, such as for archiving or trail creation. For example, such logging can facilitate or enable auditing, technical performance monitoring, such as for repair or upgrades or customer service, or financial model/performance use. For example, one or more of such logs can be manually or automatically reviewed or examined in order to determine one or more aspects of how the end user uses the player request, track contract compliance, or perform benefit analysis, such as when the end user alleges that the end user could not access the video or was not satisfied with the video.

In block 1320, the DPT service outputs a result based on the block 1316, where the user, such as the user 102 in FIG. 1, receives a video player and content can be provided to the video player, such as via streaming, based on available content sources.

In block 1322, the DPT service facilitates or enables the end user to watch the video, as requested via the block 1302.

In an embodiment, the DPT service is configured to periodically communicate with the player, such as via pinging or a status alert, so that if the geolocation changes, such as during travel, for instance in a vehicle, the player can change, which can be streamlined smoothly without disruption to consumer experience during content consumption. Alternatively or additionally, such functionality can also be utilized in network changes, whether between networks or along a network. For example, if the DPT service determines that network quality is reduced/degraded, then the DPT service can change the player or handover to another player, which can be in real-time, which can be streamlined smoothly without disruption to consumer experience during content consumption. Further, such changes can be based on network subscription, where a network with a lower subscription fee or lower bandwidth limit results in one player and a network with a higher subscription fee or higher bandwidth limit results in another player, with the players differing based on bandwidth consumption/utilization.

In an embodiment, the DPT service is configured to provided lower quality content or player if the user is not entitled. Alternatively or additionally, the DPT service can be configured to provide ads within the content if the user is not subscribed.

Figure 14:
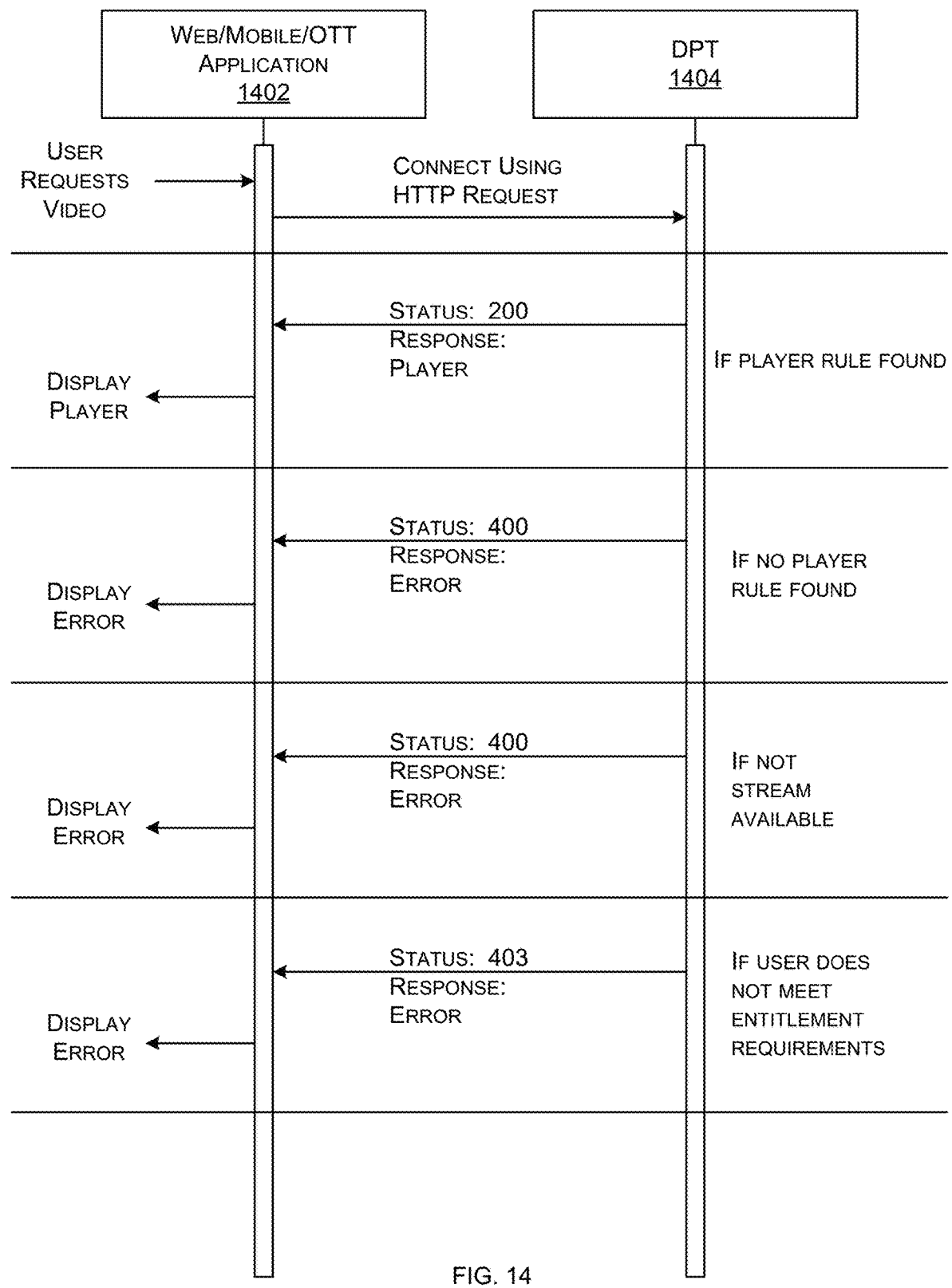
FIG. 14 shows a sequence diagram for presenting content according to an embodiment of the present disclosure.

FIG. 14 shows a sequence diagram for presenting content according to an embodiment of the present disclosure. Some concepts shown in this figure are described above. Therefore, any repetitive detailed description thereof will hereinafter be omitted or simplified in order to avoid complication.

A sequence diagram 1400, such as based on FIG. 1 or FIG. 2, shows a software application 1402, such as the web application 104, the mobile application 106, or the OTT application 108 of FIG. 1, receives a request from a user, such as the user 102, for a video on-demand. The software application connects to a DPT engine 1404 via an HTTP request, but other types of network communication are possible, such as HTTPS or others. If the DPT engine 1404 is able to identify and to apply a rule, such as the rule described in reference to FIG. 1, then the DPT engine 1404 responds with a relevant player to the software application 1402 based on the application of the rule such that the user is able to access the player. However, if the DPT engine 1404 is not able to identify the rule, then the DPT engine 1404 responds with an error message to the software application 1402 such that the user is able to access the error message, such as visually or via sound. Likewise, if the DPT engine 1404 is not able to access a stream or the stream is not available to the DPT engine 1404, then the DPT engine 1404 responds with an error message to the software application 1402 such that the user is able to access the error message. Similarly, if the DPT engine 1404 determines that the end user does not meet an entitlement requirement or if the DPT engine 1404 is not able to determine that the end user meets an entitlement requirement, then the DPT engine 1404 responds with an error message to the software application 1402 such that the user is able to access the error message.

FIG. 15 shows a flowchart of a method for data flow according to an embodiment of the present disclosure. Some concepts shown in this figure are described above. Therefore, any repetitive detailed description thereof will hereinafter be omitted or simplified in order to avoid complication.

A method 1500 includes blocks 1502-1526. The method 1500 is used to flow data, such as based on FIG. 1 or FIG. 2.

In block 1502, a DPT engine receive a player request for a video, such as described in reference to FIG. 1.

In block 1504, the DPT engine ensures that the player request is authenticated appropriately, such as from an authenticated computer. For example, if the DPT engine is configured to allow for open access, then most requests will pass this authentication check and block 1508 will be performed. Otherwise, block 1506 is performed, where an error is rendered, such as via an output of a message.

In block 1508, the DPT engine evaluates a status of the video being requested via the player request. Such evaluation of the status is to determine if the video is active or has inactive, such as taken down. If the video is inactive, the block 1506 is performed. Otherwise, block 1510 is performed.

In block 1510, the DPT engine determines device information and geolocation information based on the player request, such as described in reference to FIG. 1.

In block 1512, the DPT engine determines a user context, such as described in reference to FIG. 1 and disclosed herein. For example, the user context can comprise a user entitlement to the video.

In block 1514, the DPT engine searches for a player rule and finds the player rule. Otherwise, block 1524 is performed, where a bad request message is output.

In block 1516, the DPT engine verifies the user entitlement, if required. For example, block 1516 can be optionally performed. If not, then block 1526 is performed, where an authorization error is output.

In block 1518, the DPT engine applies the rule to the player request based on device type or geolocation, as described in reference to FIG. 1. Otherwise, block 1524 is performed.

In block 1520, the DPT engine renders a player response, as described in reference to FIG. 1. Note that where "global" and "any device" are available as rules, the best matching player may be returned.

In block 1522, the DPT engine facilitates video streaming based on the player response, as described in reference to FIG. 1.

FIG. 16 shows a diagram of a data representation according to an embodiment of the present disclosure. Some concepts of shown this figure are described above. Therefore, any repetitive detailed description thereof will hereinafter be omitted or simplified in order to avoid complication.

A data representation 1600 includes a player rule set 1602, which allows for a setting of a rule based on geographic data, such as a country or a region, whether single or multiple. The player rule set 1602 allows for a setting of a rule based on device data, such as a browser type, a set-top computer, or a mobile device, whether single or multiple. The player rule set 1602 allows for a setting of a rule based on a content player, such as a YouTube® player, a generic player, a customized player, a set-top native player, which can be single only. The player rule set 1602 allows for a setting of a rule for confirming a subscription requirement, such as a Boolean or a true/false value. The player rule set 1602 allows for a setting of a rule for any third party data configured for evaluation.

The data representation 1600 includes video data 1604, which includes a title of a video, a duration of the video, a description of the video or any related metadata, such as actors, characters, or other data that may be assigned, and data source for the video. Note that the DPT engine, such as described in reference to FIGS. 2-3, can aggregates content from third-party sources, such as Hulu® or YouTube® or media files directly uploaded to the DPT engine.

The data representation 1600 includes data source information 1606, 1608, and 1610, which include information relevant to each aggregation point. For example, Hulu® or YouTube® sources contain a set of identifying information to access and synchronize content from those sources. However, where authentication is required, the DPT engine has access to or stores and authenticate based on data source information 1606, 1608 to those systems on an as needed basis. Note that the data representation 1600 also includes data source information 1612, which is configured for live streaming, such as stream name, stream start and end time, and a thumbnail. Further, note that the data representation 1600 also includes consumer data 1614, subscription data 1616, and transaction data 1618.

FIG. 17 shows a diagram of a data flow according to an embodiment of the present disclosure. Some concepts of shown this figure are described above. Therefore, any repetitive detailed description thereof will hereinafter be omitted or simplified in order to avoid complication.

A data flow 1700 shows a software application 1702 communicating with a DPT API 1704. For example, the software application 1702 can include at least one of a web application 1702a, a mobile application 1702b, and a OTT application 1702c, as disclosed herein. The DPT API 1706 communicates with a DPT engine 606, which is software based. The DPT engine 1706 retrieves data from a DPT database 1708, which stores the rules, as described in reference to FIG. 1. The DPT engine 1706 comprises a plurality of components 1706a-d, such as modules or logic units, such as a geolocation component 1706a, a device detection component 1706b, a user detection component 1706c, and a video authorization component 1706d. Although the components 1706a-d are shown as distinct within the DPT engine 1706, in some embodiments, at least two of the components 1706a-d are a single unit. The components 1706a-d perform their named functions, as disclosed herein.

The software application 1702, such as the web application 104, the mobile application 106, or the OTT application 108 in FIG. 1, sends a request for a video player onto the DPT API 1704, which communicates the request to the DPT engine 1706 for processing via applying the rules from the database 1708 to the request. For example, the components 1706a-d operably interface with each other for such functionality. Note that the software application 1702 is authorized to make a request to the DPT API 1704. The DPT API 1704 can comprise a web service which manages such requests. The DPT engine 1706 processes such requests. The database 1708 contains any configuration information, including video metadata and rules, to process requests. The database 1708 can be relational or post-relational or in-memory.

Figure 18:
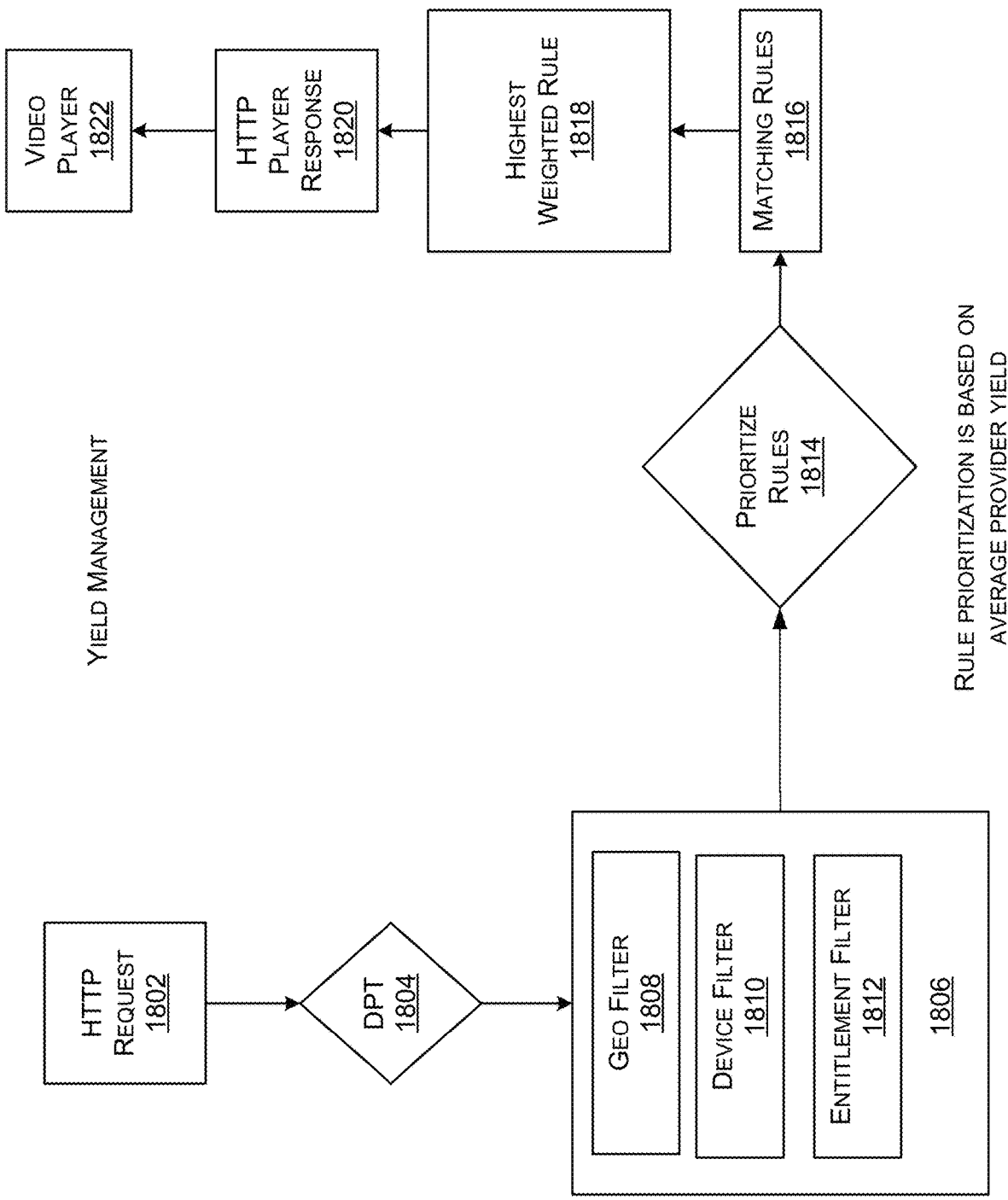
FIG. 18 shows a flowchart of a method for yield management according to an embodiment of the present disclosure.

FIG. 18 shows a flowchart of a method for yield management according to an embodiment of the present disclosure. Some concepts of shown this figure are described above. Therefore, any repetitive detailed description thereof will hereinafter be omitted or simplified in order to avoid complication.

A method 1800 includes blocks 1802-1822. The method 1800 is used to manage yield based on rule prioritization. Such management allows a computer system, such as the computer system 112, as described in reference to FIG. 1, to be used to optimize revenue streams. More specifically, each video provider (based on video source) is assigned a provider yield factor, such as 0.2, 0.4, or 0.8. These factors can be set manually, or automatically updated based on the revenue stream partners' available data.

In block 1802, an HTTP request is communicated to a DPT engine, such as described in reference to FIG. 3. The request is for a player to play video on-demand.

In block 1804, the DPT engine receives the request.

In block 1806, the DPT engine employs a filtering unit, such as the player rules unit 114. The filter unit accesses or contains a geolocation filter 1808, a device filter 1810, and an entitlement filter 1112, which filter the request as described in reference to FIGS. 1-3 and 13-17. For example, such filtering can be via matching a set of rules against the request, such as the geolocation, whether a region, such as North America, or a jurisdiction, like China, of the computer against the set of rules, the type of the computer, such as a mobile device running Android®, against the rules, and whether the computer is associated with a valid user entitlement.

In block 1814, the DPT engine determines that at least two rules conflict or more than one rule is applicable. Accordingly, the DPT engine, based on the yield factor, prioritizes rules to display a revenue-optimized player to the user.

In block 1816, the DPT engine matches the prioritized rules. Such matching can be as described in reference to FIG. 1. Note that the matching occurs after yield management processing so as to maximize revenue.

In block 1818, the DPT engine outputs a result based on the matching.

In block 1820, the DPT engine outputs a player response, as described in reference to FIG. 1.

In block 1822, the video player is provided.

In an embodiment, a computer, such as the computer system 112, as described in reference to FIG. 1, a first yield factor is stored which corresponds to the first player and a second yield factor is stored which corresponds to a second player, with the first yield factor is different from the second yield factor in value. A conflict between the first rule and a second rule is identified. One of the first rule and the second rule is selected based at least in part on the conflict and based at least in part on one of the first yield factor and the second yield factor such that one of the first player and the second player is selected based at least in part on one of the first yield factor and the second yield factor being greater in value, with the matching being based at least in part on one of the first rule and the second rule. Note that at least one of the first yield factor and the second yield factor can be set manually, such as via a GUI. Also note that at least one of the first yield factor and the second yield factor can be set automatically based on a communication with a data source associated with at least one of the first player and the second player, such as a network-implemented video content service, such as Hulu®.

Figure 19:
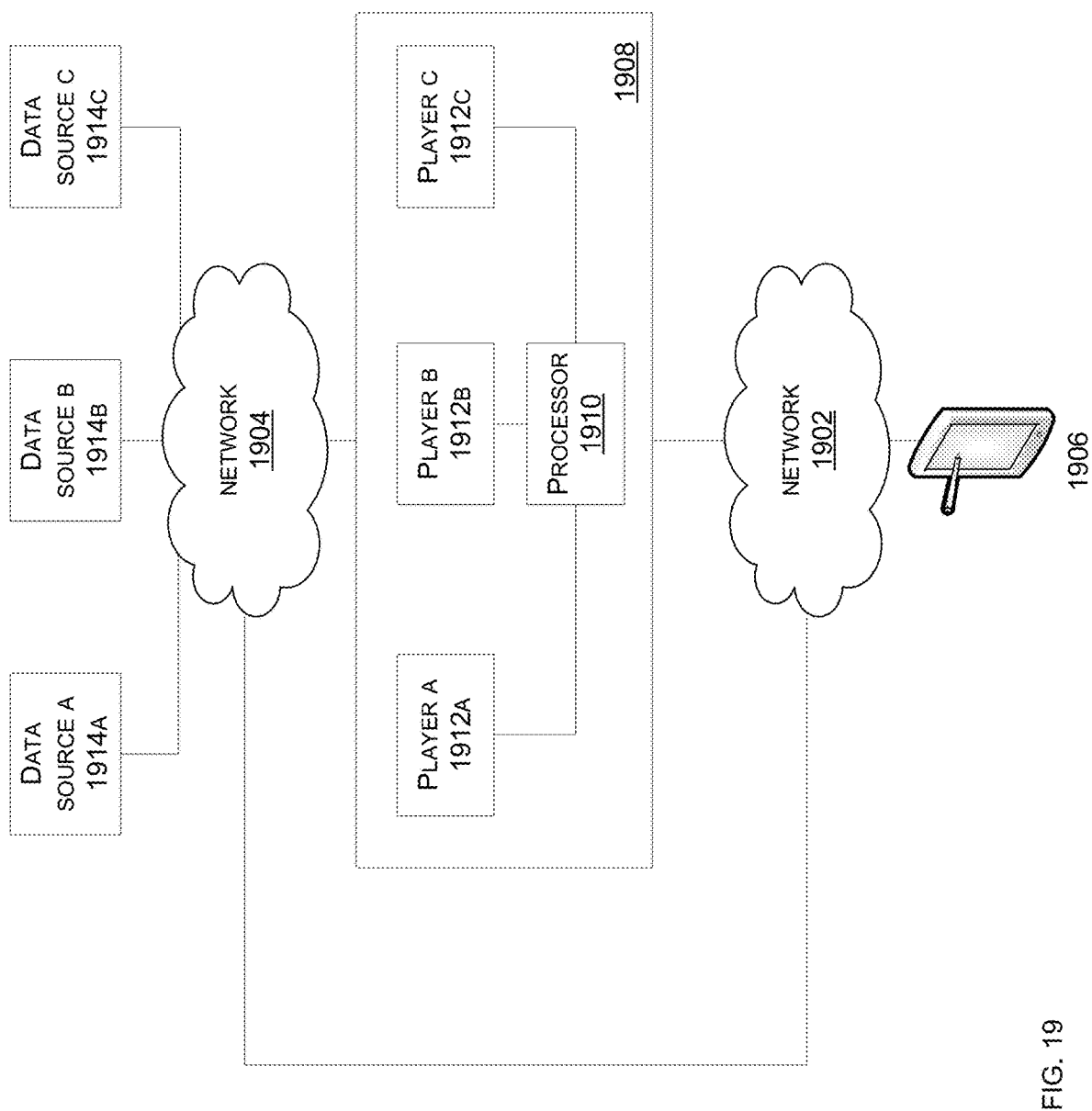
FIG. 19 shows a network topology for presenting a content according to an embodiment of the present disclosure.

FIG. 19 shows a network topology for presenting a content according to an embodiment of the present disclosure. Some concepts of shown this figure are described above. Therefore, any repetitive detailed description thereof will hereinafter be omitted or simplified in order to avoid complication.

A network topology 1900 includes a network 1902, a network 1904, a tablet 1906, a server 1908, and a plurality of data sources 1914a-c. For example, the network 1902 can be a wide area network (WAN) or a local area network (LAN). For example, the network 1904 can be a WAN or a LAN. The network 1902 and the network 1904 are communicably coupled to each other, whether directly or indirectly, such as through another network. The network 1902 is coupled to the tablet 1906 and the server 1908, whether directly or indirectly, such as through another network. The network 1904 is coupled to the server 1908 and the data sources 1914a-c, whether directly or indirectly, such as through another network. The network 1902 and the network 1904 can be functionally or structurally equivalent or different from each other in any way. Although the tablet 1906 is used, any number and any type of computer can be used, such as a mobile phone, a desktop, a vehicle computer, a video game console, or others.

The data sources 1914a-c are communicably coupled to the network 1904, whether directly or indirectly, such as through another network. The data sources 1914a-c can be functionally or structurally equivalent or different from each other in any way. The data sources 1914a-c provide content, such as audio, video, and/or any others. Such provision can be via hosting, streaming, sending, or otherwise providing. Each of the data sources 1914a-c can comprise one or more servers, mainframes, or computing clusters.

The server 1908 is communicably coupled to the network 1902 and the network 1904, whether in an equivalent manner or different manners, whether directly or indirectly, such as through another network. The server 1908 comprises a processor 1910, which can be programmed to allow a selection of a content player, from a plurality of players 1912a-c, based on a set of rules. For example, the server 1908 can run a DPT engine, as disclosed herein, which processes a player request for a video, such as when the player request is received from the tablet 1906 over the network 1902. The DPT engine ensures that the player request is authenticated appropriately, such as from an authenticated computer, such as the tablet 1906. For example, if the DPT engine is configured to allow for open access, then most requests, such as from the tablet 1906, will pass this authentication check. Otherwise, an error message is rendered on the tablet 1906, such as over the network 1902. The DPT engine evaluates a status of the video being requested via the player request, such as via interfacing with at least one of the data sources 1914a-c over the network 1904. Such evaluation of the status is to determine if the video is active or has inactive, such as taken down from at least one of the data sources 1914a-c. If the video is inactive, then an error message is rendered on the tablet 1906, such as over the network 1902. Otherwise, the DPT engine determines device information and geolocation information based on the player request, such as based on the tablet 1906. For example, the DPT engine can communicably interface with or process the player request to determine information of the tablet 1906 and geolocation information on the player request, such as obtained via the tablet 1906 over the network 1902. The DPT engine can then determine, such as via searching a data structure, whether hosted locally or remotely hosted, such as over the network 1902 or the network 1904, if a player rule exists, as hosted locally or other accessible, such as over a network. The DPT engine can then find the rule. Otherwise, an error message is rendered on the tablet 1906, such as over the network 1902. The DPT engine can apply the rule to the player request based on device type and geolocation, such as based on matching. Otherwise, an error message is rendered on the tablet 1906, such as over the network 1902. The DPT engine can render a player response, such as via selecting, referring, providing, or granting access to an appropriate content player, as selected from a group of players comprising the players 1912a-c. Note that the players 1912a-c correspond to the data sources 1914a-c, whether in a one-to-one manner, one-to-many manner, many-to-one manner, or many-to-many manner. As a result, the server 1908, via the DPT engine, facilitates content provision or content access or content reference to the tablet 1906, such as over at least one of the network 1902 or the network 1904, based on the player response. For example, the content can be video streamed.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

In some embodiments, an apparatus or system comprise at least one processor, and memory storing instructions that, when executed by the at least one processor, cause the apparatus or system to perform one or more methodological acts as described herein. In some embodiments, the memory stores data, such as one or more structures, metadata, lines, tags, blocks, strings, or other suitable data organizations.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description herein.

As will be appreciated by one skilled in the art, aspects of this disclosure can be embodied as a system, method or computer program product. Accordingly, aspects of the present disclosure can take the form of an entirely hardware embodiment, an entirely software embodiment (including firmware, resident software, micro-code, etc.) or as embodiments combining software and hardware aspects that can all generally be referred to herein as a "circuit," "module" or "system." Furthermore, aspects of the disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to wireless, wireline, optical fiber cable, radiofrequency (RF), etc., or any suitable combination of the foregoing.

Computer program code for carrying out operations for aspects of the present disclosure can be written in any combination of one or more programming language, including an object oriented programming language, such as Java, Smalltalk, C++ or the like and conventional procedural programming language, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a LAN or a WAN, or the connection can be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure.

The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated. It will be understood that those skilled in the art, both now and in the future, can make various improvements and enhancements which fall within the scope of the claims which follow.

What is claimed is:

1. A method comprising:
   receiving, via a first server, a request for a content from a client;
   authenticating, via the first server, the request;
   determining, via the first server, a technical characteristic of the client based on the request after the request is authenticated via the first server;
   matching, via the first server, the technical characteristic against a rule relating to the technical characteristic;
   selecting, via the first server, a player from a plurality of players based on the matching; and
   facilitating, via the first server, a stream of the content via the player to the client based on the selecting, wherein the stream is from a second server to the client via the player.

2. The method of claim 1, wherein the content includes at least one of an audio content or a video content.

3. The method of claim 1, further comprising:
   determining, via the first server, a location of the client based on the request, wherein the location includes at least one of a geolocation or a network location, wherein the location is matched against the rule such that the player is selected based on the location.

4. The method of claim 1, further comprising:
   validating, via the first server, at least one of a subscription status of the client based on the request or an entitlement of the client based on the request, wherein the matching includes matching the at least one of the subscription status or the entitlement against the rule.

5. The method of claim 4, further comprising:
   facilitating, via the first server, a variation of quality of the content based on the at least one of the subscription status or the entitlement.

6. The method of claim 4, wherein the stream is in a first quality when the validating passes, wherein the stream is in a second quality when the validating fails, wherein the first quality is better than the second quality.

7. The method of claim 4, wherein the content includes an advertisement when the validating fails.

8. The method of claim 1, wherein the player is customizable on at least one of a graphical user interface level or a syndication level.

9. The method of claim 1, wherein the rule is provided via at least one of a user of the client, a publisher of the content, an operator of the first server, or an artificial intelligence component, wherein the artificial intelligence component is running on the first server.

10. The method of claim 1, wherein the rule is based on at least one of a location component, a computer component, a player component, a subscription component, an entitlement component, or a third party component.

11. The method of claim 1, further comprising:
providing, via the first server, a redirect to the second server when the player is unable to be selected based on the matching.

12. The method of claim 11, wherein the redirect redirects to at least one of a subscription interface, an entitlement interface, a purchase interface, or a related content interface.

13. The method of claim 1, wherein the content is hosted on a content source which supports a direct access to an underlying stream, and further comprising:
providing, via the first server, at least one of a first content stream or a second content stream to the player running on the client, wherein the first content stream is in better content quality than the second content stream, wherein at least one of the first content stream or the second content stream is based on the content via the underlying stream.

14. The method of claim 1, wherein the player comprises a visual element that can be customized.

15. The method of claim 14, wherein the visual element is rendered over the content in the player.

16. The method of claim 15, wherein the visual element is a hover-over.

17. The method of claim 14, wherein the visual element is rendered under the content in the player.

18. The method of claim 17, wherein the visual element is static.

19. The method of claim 1, wherein the player presents a watermark in the content when playing the content.

20. The method of claim 19, wherein the watermark is presented based on the rule.

21. The method of claim 20, wherein the watermark is positioned based on the rule.

22. The method of claim 1, wherein the technical characteristic is determined before another attribute associated with the client.

23. The method of claim 1, wherein the player is a first player, wherein a change in a location of the client leads to a change from the first player to a second player.

24. The method of claim 1, further comprising:
serving, via the first server, the content for the player to the second client.

25. The method of claim 1, further comprising:
receiving, via the first server, data from the player running on the client, wherein the data is informative of a consumption event corresponding to the content.

26. The method of claim 1, wherein the rule is a first rule, wherein the player is a first player, and further comprising:
storing, via the first server, a first yield factor corresponding to the first player and a second yield factor corresponding to a second player, wherein the first yield factor is different from the second yield factor in value;
identifying, via the first server, a conflict between the first rule and a second rule;
selecting, via the first server, one of the first rule or the second rule based on the conflict and based on one of the first yield factor or the second yield factor such that one of the first player or the second player is selected based on one of the first yield factor or the second yield factor being greater in value, wherein the matching is based on one of the first rule or the second rule.

27. The method of claim 26, wherein at least one of the first yield factor or the second yield factor is set manually.

28. The method of claim 26, wherein at least one of the first yield factor or the second yield factor is set automatically based on a communication with a data source associated with at least one of the first player or the second player.

29. The method of claim 1, wherein the content includes a first content file hosted on a first content database and a second content file hosted on a second content database, wherein the player selects at least one of the first content database or the second content database to play at least one of the first content file or the second content file based on the matching.

30. The method of claim 1, wherein the rule is a licensing rule.

31. A method comprising:
receiving, via a first server, a request for a content from a client;
authenticating, via the first server, the request;
determining, via the first server, a location of the client based on the request after the request is authenticated via the first server;
matching, via the first server, the location against a rule relating to the location;
selecting, via the first server, a player from a plurality of players based on the matching; and
facilitating, via the first server, a stream of the content via the player to the client based on the selecting, wherein the stream is from a second server to the client via the player.

32. The method of claim 31, wherein the content includes at least one of an audio content or a video content.

33. The method of claim 31, further comprising:
determining, via the first server, a technical characteristic of the client based on the request, wherein the technical characteristic is matched against the rule such that the player is selected based on the technical characteristic.

34. The method of claim 31, further comprising:
validating, via the first server, at least one of a subscription status of the client based on the request or an entitlement of the client based on the request, wherein the matching includes matching the at least one of the subscription status or the entitlement against the rule.

35. The method of claim 34, further comprising:
facilitating, via the first server, a variation of quality of the content based on the at least one of the subscription status or the entitlement.

36. The method of claim 34, wherein the stream is in a first quality when the validating passes, wherein the stream is in a second quality when the validating fails, wherein the first quality is better than the second quality.

37. The method of claim 34, wherein the content includes an advertisement when the validating fails.

38. The method of claim 31, wherein the player is customizable on at least one of a graphical user interface level or a syndication level.

39. The method of claim 31, wherein the rule is provided via at least one of a user of the client, a publisher of the content, an operator of the first server, or an artificial intelligence component, wherein the artificial intelligence component is running on the first server.

40. The method of claim 31, wherein the rule is based on at least one of a location component, a computer component, a player component, a subscription component, an entitlement component, an permissioning component, or a third party component.

41. The method of claim 31, further comprising:
providing, via the first server, a redirect to the second server when the player is unable to be selected based on the matching.

42. The method of claim 41, wherein the redirect redirects to at least one of a subscription interface, an entitlement interface, a purchase interface, permission interface, or a related content interface.

43. The method of claim 31, wherein the content is hosted on a content source which supports a direct access to an underlying stream, and further comprising:
providing, via the first server, at least one of a first content stream or a second content stream to the player running on the client, wherein the first content stream is in better content quality than the second content stream, wherein at least one of the first content stream or the second content stream is based on the content via the underlying stream.

44. The method of claim 31, wherein the player comprises a visual element that can be customized.

45. The method of claim 44, wherein the visual element is rendered over the content in the player.

46. The method of claim 45, wherein the visual element is a hover-over.

47. The method of claim 44, wherein the visual element is rendered under the content in the player.

48. The method of claim 47, wherein the visual element is static.

49. The method of claim 31, wherein the player presents a watermark in the content when playing the content.

50. The method of claim 49, wherein the watermark is presented based on the rule.

51. The method of claim 50, wherein the watermark is positioned based on the rule.

52. The method of claim 31, wherein the location is determined before another attribute associated with the client.

53. The method of claim 31, wherein the player is a first player, wherein a change in a technical characteristic of the client leads to a change from the first player to a second player.

54. The method of claim 31, further comprising:
serving, via the first server, the content for the player to the second client.

55. The method of claim 31, further comprising:
receiving, via the first server, data from the player running on the client, wherein the data is informative of a consumption event corresponding to the content.

56. The method of claim 55, wherein the rule is a first rule, wherein the player is a first player, and further comprising:
storing, via the first server, a first yield factor corresponding to the first player and a second yield factor corresponding to a second player, wherein the first yield factor is different from the second yield factor in value;
identifying, via the first server, a conflict between the first rule and a second rule;
selecting, via the first server, one of the first rule or the second rule based on the conflict and based on one of the first yield factor or the second yield factor such that one of the first player or the second player is selected based on one of the first yield factor or the second yield factor being greater in value, wherein the matching is based on one of the first rule or the second rule.

57. The method of claim 56, wherein at least one of the first yield factor or the second yield factor is set manually.

58. The method of claim 56, wherein at least one of the first yield factor or the second yield factor is set automatically based on a communication with a data source associated with at least one of the first player or the second player.

59. The method of claim 31, wherein the content includes a first content file hosted on a first content database and a second content file hosted on a second content database, wherein the player selects at least one of the first content database or the second content database to play at least one of the first content file or the second content file based on the matching.

60. The method of claim 31, wherein the rule is a licensing rule.

61. The method of claim 31, wherein the location includes at least one of a geolocation or a network location.

62. A method comprising:
receiving, via a first server, a request for a video content from a mobile application running on a mobile client;
authenticating, via the first server, the request;
determining, via the first server, a technical characteristic of the mobile client based on the request after the request is authenticated via the first server;
matching, via the first server, the technical characteristic against a rule relating to the technical characteristic;
selecting, via the first server, a video player from a plurality of video players based on the matching; and
enabling, via the first server, a stream of the video content from a second server to the mobile client such that that the video player plays the video content within the mobile application based on the selecting.

63. A method comprising:
receiving, via a first server, a request for a video content from a client;
authenticating, via the first server, the request;
determining, via the first server, whether the client is permissioned to access the video content after the request is authenticated via the first server;
selecting, via the first server, a player from a plurality of players based on the determining, wherein the players are programmed to play the video content; and
facilitating, via the first server, a stream of the video content to the client based on the selecting such the video content is accessed on the client via the player, wherein the stream is from a second server to the client.

64. The method of claim 63, wherein the determining includes validating, via the first server, at least one of a subscription status of the client based on the request or an entitlement of the client based on the request, wherein the at least one of the subscription status or the entitlement relates to the video content.

65. The method of claim 64, wherein the validating includes facilitating, via the first server, a variation of quality of the video content based on the at least one of the subscription status or the entitlement.

* * * * *